United States Patent [19]
Tanaka et al.

[11] Patent Number: 5,140,487

[45] Date of Patent: Aug. 18, 1992

[54] MAGNETIC TAPE CASSETTE HAVING DYNAMIC TAPE GUIDE

[75] Inventors: Masato Tanaka; Kiyotaka Yanaka, both of Tokyo, Japan

[73] Assignee: Sony Corporation, Tokyo, Japan

[21] Appl. No.: 622,830

[22] Filed: Dec. 5, 1990

[30] Foreign Application Priority Data

| Dec. 6, 1989 | [JP] | Japan | 1-141175[U] |
| Dec. 6, 1989 | [JP] | Japan | 1-317026 |
| Dec. 6, 1989 | [JP] | Japan | 1-317027 |
| Dec. 6, 1989 | [JP] | Japan | 1-317028 |
| Oct. 19, 1990 | [JP] | Japan | 2-280786 |

[51] Int. Cl.$^5$ .......................................... G11B 23/087
[52] U.S. Cl. ........................................ 360/132; 360/85
[58] Field of Search ................. 360/85, 132, 95; 242/197-201

[56] References Cited

U.S. PATENT DOCUMENTS 4,807,077 2/1989 Zaitsu et al. .................. 360/85

Primary Examiner—David J. Severin
Attorney, Agent, or Firm—Lewis H. Eslinger; Jay H. Maioli

[57] ABSTRACT

The magnetic tape cassette of the present invention has the opening portion into which the head drum having the rotary head is inserted. The pair of tape guide members which guide the tape-like record medium so that the record medium is helically wrapped around the head drum are provided in the inside of the opening portion so as to be able to swing independently. Thus, when the head drum is inserted into the opening portion, the two tape guide members are brought in circumferential contact with the peripheral surface of the head drum accurately. Therefore, the recording and/or reproduction can be reliably carried out, which can increase reliability of the magnetic tape cassette.

12 Claims, 17 Drawing Sheets

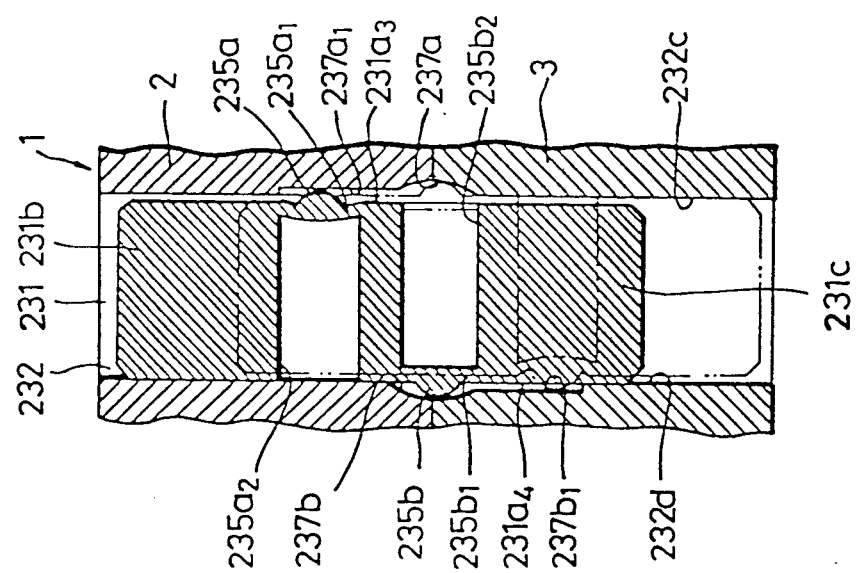
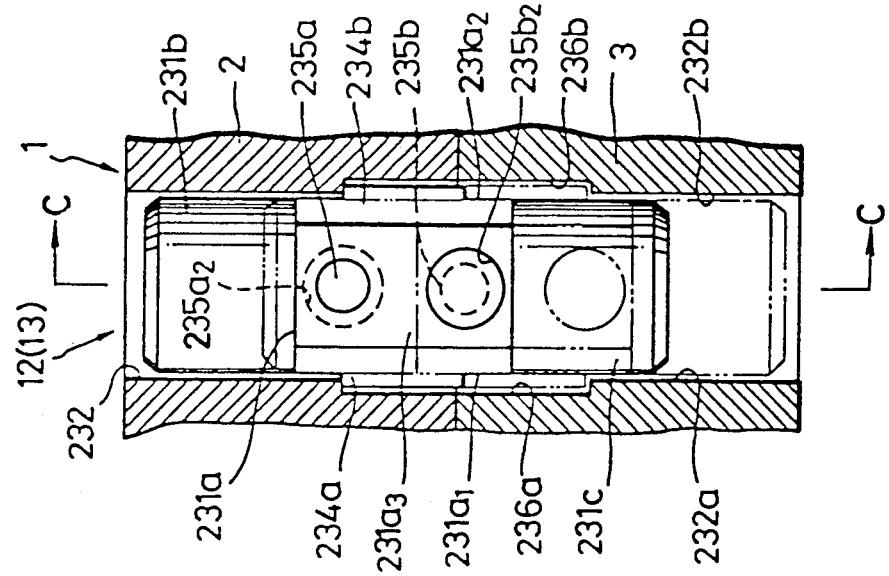
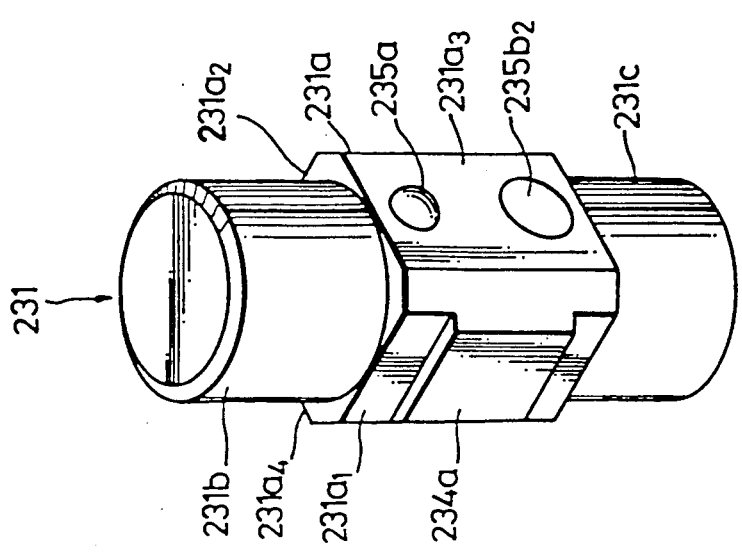

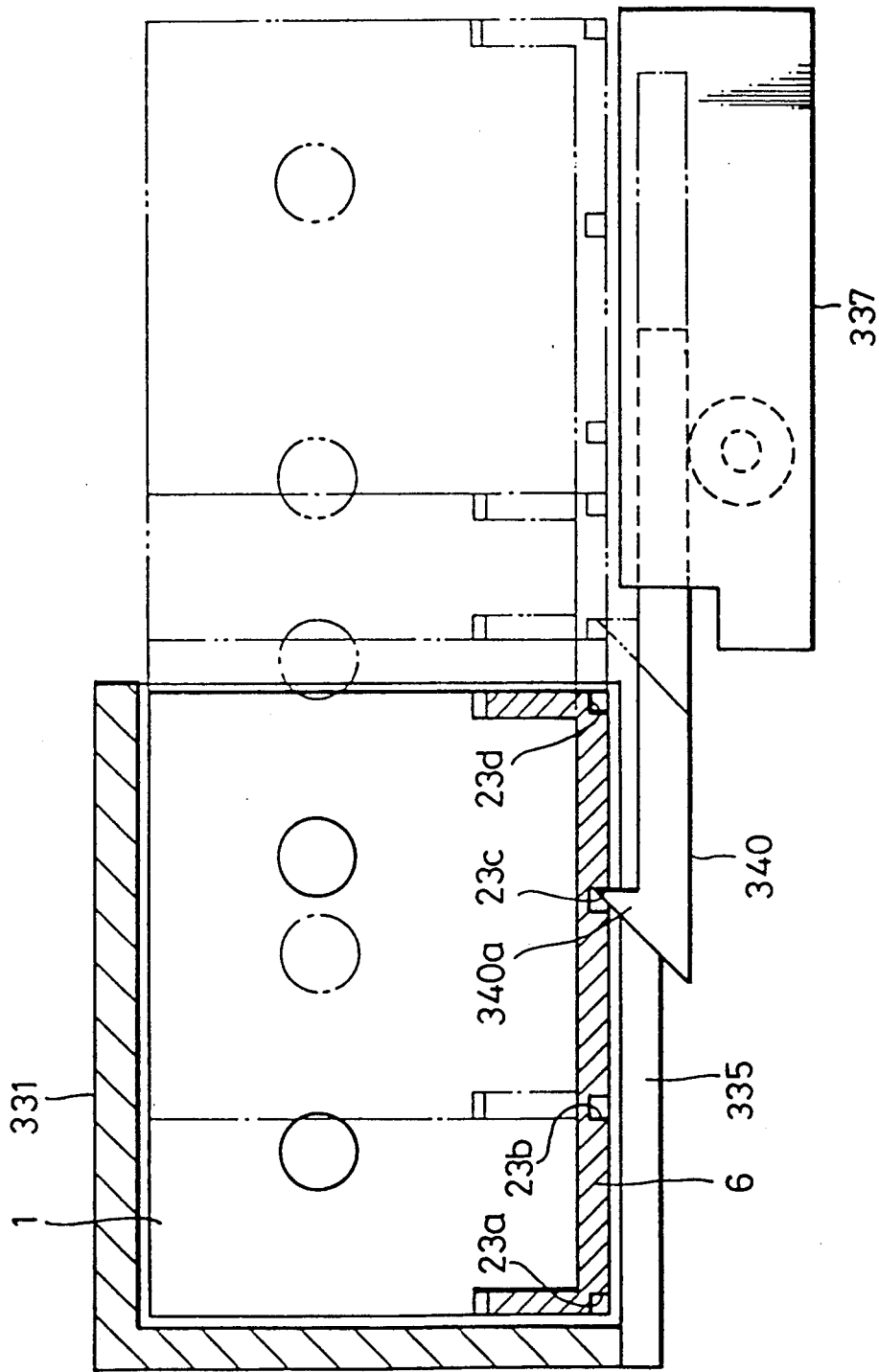

MAGNETIC TAPE CASSETTE HAVING DYNAMIC TAPE GUIDE

BACKGROUND OF THE INVENTION

1. Field of the Invention

The present invention relates generally to magnetic tape cassettes and, more particularly, is directed to a magnetic tape cassette having a cassette casing in which a tape-like record medium is wound around reel hubs and housed and in which the tape-like record medium is helically wrapped around a head drum inserted into an opening portion of the cartridge to thereby perform recording and/or reproduction in a helical scan fashion.

2. Description of the Prior Art

In order to miniaturize a helical scan type recording and reproducing apparatus, a magnetic tape cassette is proposed, in which one portion of a head drum having a rotary head is inserted into a front surface side opening portion of a cassette casing and a tape-like record medium, i.e. a magnetic tape housed in the cassette casing is brought in slidable contact with the peripheral surface of the head drum.

In the aforementioned tape cassette, a tape guide having a recess formed at a front surface thereof is provided at the inside of the front surface side opening portion of the cassette casing, and the head drum is received by this recess. Also, the magnetic tape is guided and helically wrapped around the head drum by inclined guides having opposite inclination angles formed at left and right sides of the recess, whereby the rotary head provided on the head drum obliquely scans the magnetic tape to thereby perform the recording and/or reproduction in a helical scan fashion.

Japanese Patent Laid-Open Gazette No. 64-73584 describes another proposal of the above-mentioned magnetic tape cassette, in which the tape guides having the inclined guides are molded independently of the cassette casing and assembled inside the opening portion of the cassette casing.

In this previously-proposed magnetic tape cassette, it is needless to say that the tape guides provided inside the front surface side opening portion of the cassette casing are molded integrally with a cassette shell which forms the cassette casing. Also, even in the magnetic tape cassette in which the tape guides are molded independently of the cassette casing as described in Japanese Patent Laid-Open Gazette No. 64-73584, the tape guides must be secured to the cassette shell.

More particularly, the tape guides independently molded are assembled in the inside of the opening portion of one cassette shell (lower half) such that their central portions are engaged with central pins and two side portions thereof are engaged to restriction surfaces or engaging pins. Thus, the tape guides are assembled in the inside of the opening portion of the cassette casing under the condition such that they cannot be moved.

There is then a risk that the head drum inserted into the opening portion of the tape cassette cannot be received by the tape guides satisfactorily.

That is, since the tape guides are secured to the cassette casing, if the tape cassette is not correctly loaded onto the recording and reproducing apparatus the tape guides will not be properly aligned. Further, if the head drum is not precisely inclined more or less and so on, even when the head drum is inserted into the opening portion of the cassette casing, the head drum may not come in contact with the tape guides correctly so that the magnetic tape is brought in contact with the peripheral surface of the head drum in an unstable manner, causing a trouble in the recording and/or reproduction.

OBJECTS AND SUMMARY OF THE INVENTION

Accordingly, it is a general object of the present invention to provide an improved magnetic tape cassette which can eliminate the aforenoted shortcomings and disadvantages encountered with the prior art.

More specifically, it is an object of the present invention to provide a magnetic tape cassette in which recording and/or reproduction can be carried out reliably.

It is another object of the present invention to provide a magnetic tape cassette whose reliability can be increased.

It is still another object of the present invention to provide a magnetic tape cassette in which cassette shells can be prevented from being deformed.

It is a further object of the present invention to provide a magnetic tape cassette which can reduce manufacturing costs.

As an aspect of the present invention, the magnetic tape cassette of the present invention has the opening portion into which the head drum having the rotary head is inserted. The pair of tape guide members which guide the tape-like record medium so that the record medium is helically wrapped around the head drum are provided in the inside of the opening portion so as to be able to swing independently. Thus, when the head drum is inserted into the opening portion, the two tape guide members are brought in circumferential contact with the surface of the head drum accurately. Therefore, the recording and/or reproduction can be reliably carried out, which can increase reliability of the magnetic tape cassette.

The above, and other objects, features and advantages of the present invention will become apparent from the following detailed description of illustrative embodiments to be taken in conjunction with the accompanying drawings, in which like reference numerals are used to identify the same or similar parts in the several views.

BRIEF DESCRIPTION OF THE DRAWINGS

FIG. 15 is a perspective view of a protective plug of a mis-erase preventing mechanism of the present invention;

FIG. 16 is a diagrammatic view of a section showing the mis-erase preventing mechanism of the present invention from the front side thereof;

FIG. 17 is a cross-sectional view taken along the line C—C of FIG. 16;

FIG. 20 is a schematic diagram used to explain how to take the magnetic tape cassette out of the cassette magazine.

DETAILED DESCRIPTION OF THE PREFERRED EMBODIMENTS

Figure 1:
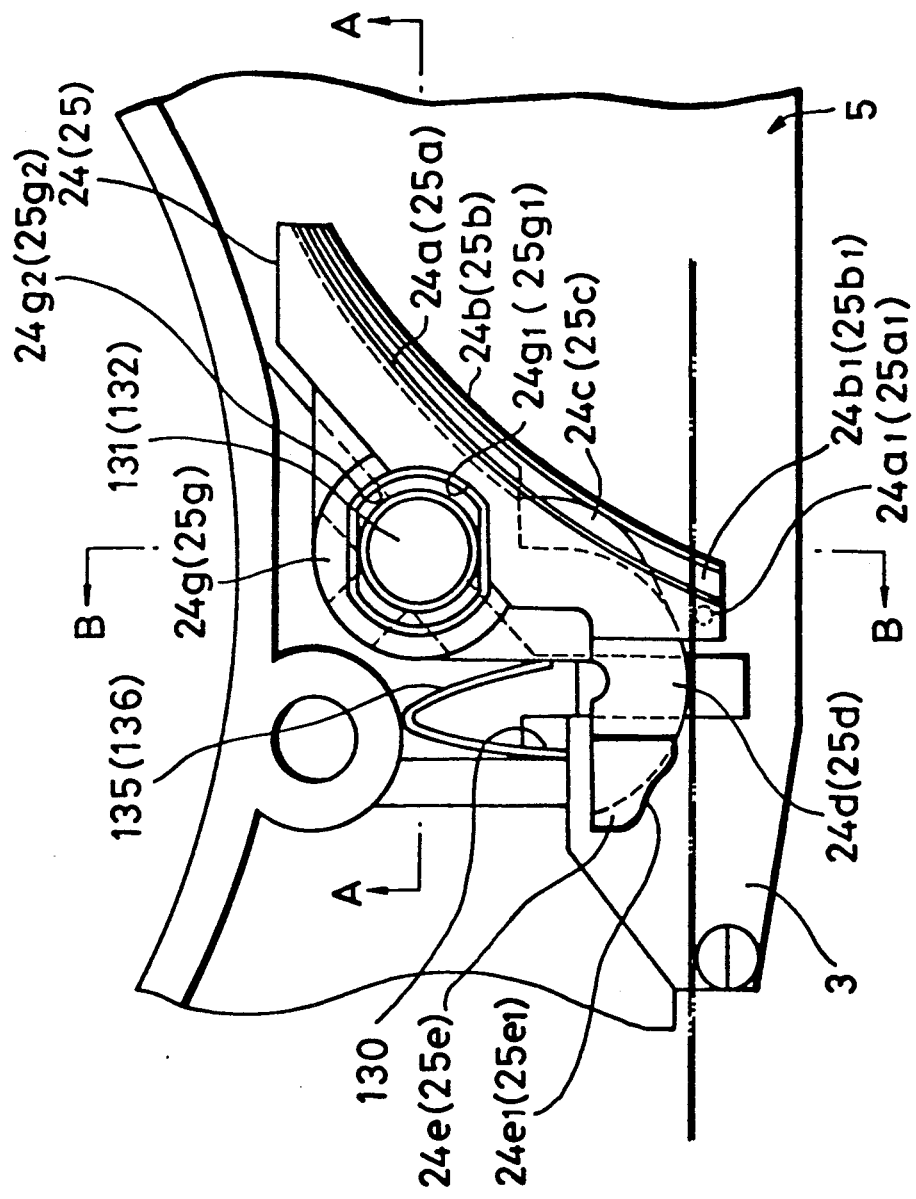
FIG. 1 is a fragmentary plan view of a main portion of an embodiment of a magnetic tape cassette according to the present invention.
Figure 2:
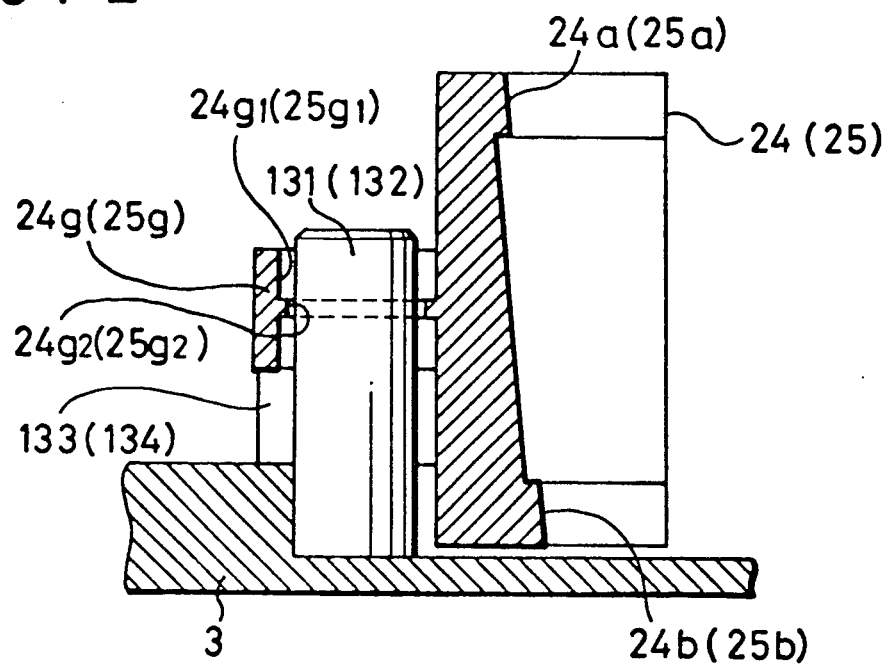
FIG. 2. is a cross-sectional view taken through the line A—A of FIG. 1.
Figure 3:
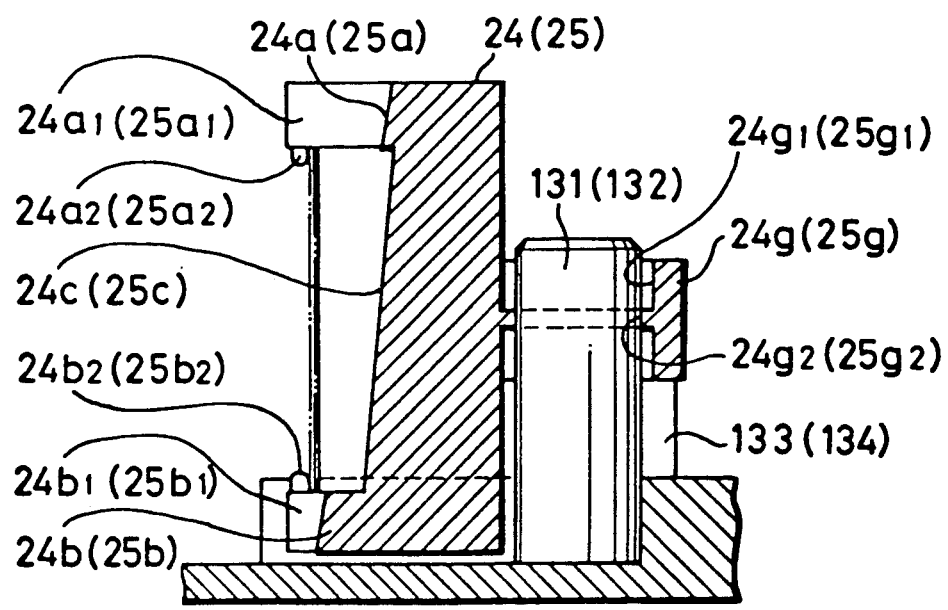
FIG. 3 is a cross-sectional view taken through the line B—B of FIG. 1.
Figure 4:
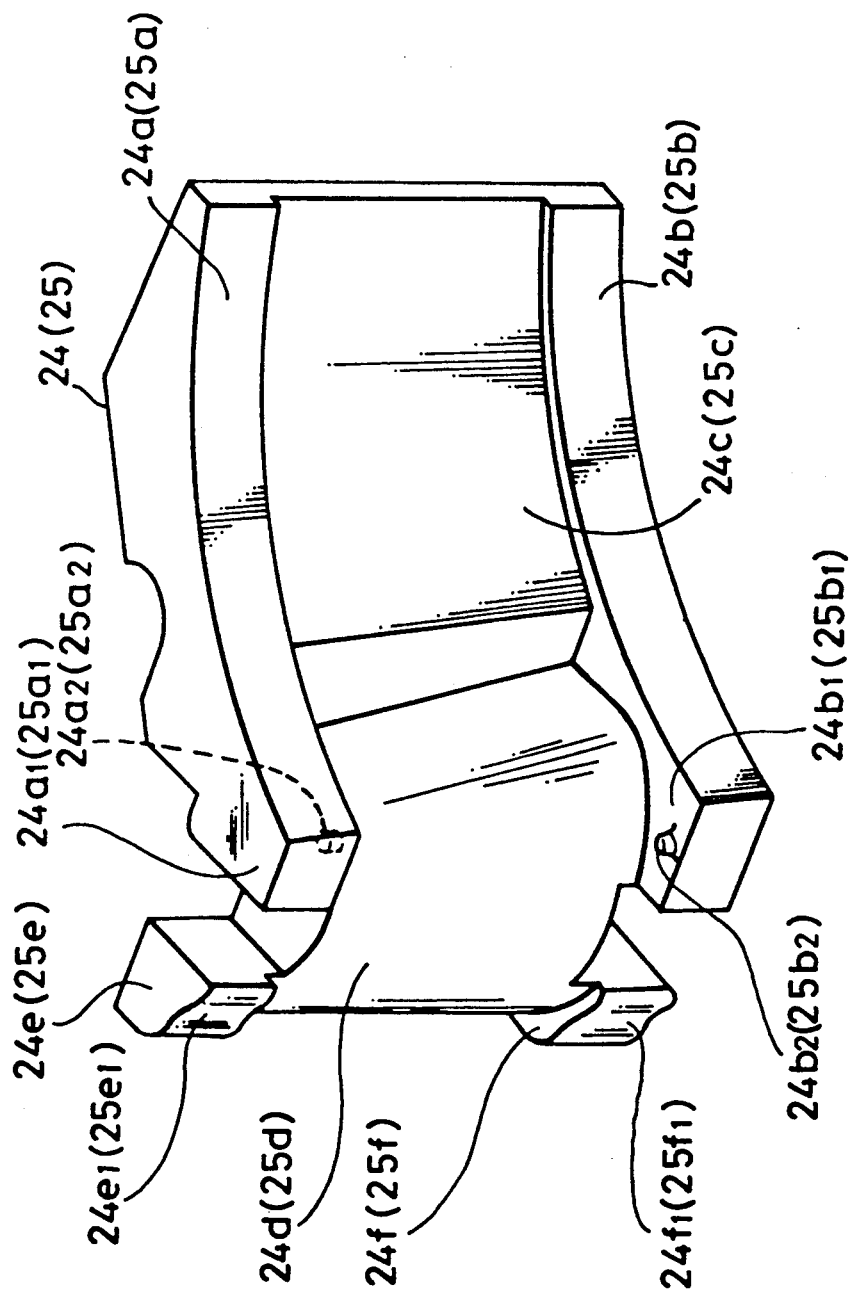
FIG. 4 is a perspective view of a tape guide member used in the present invention.
Figure 5:
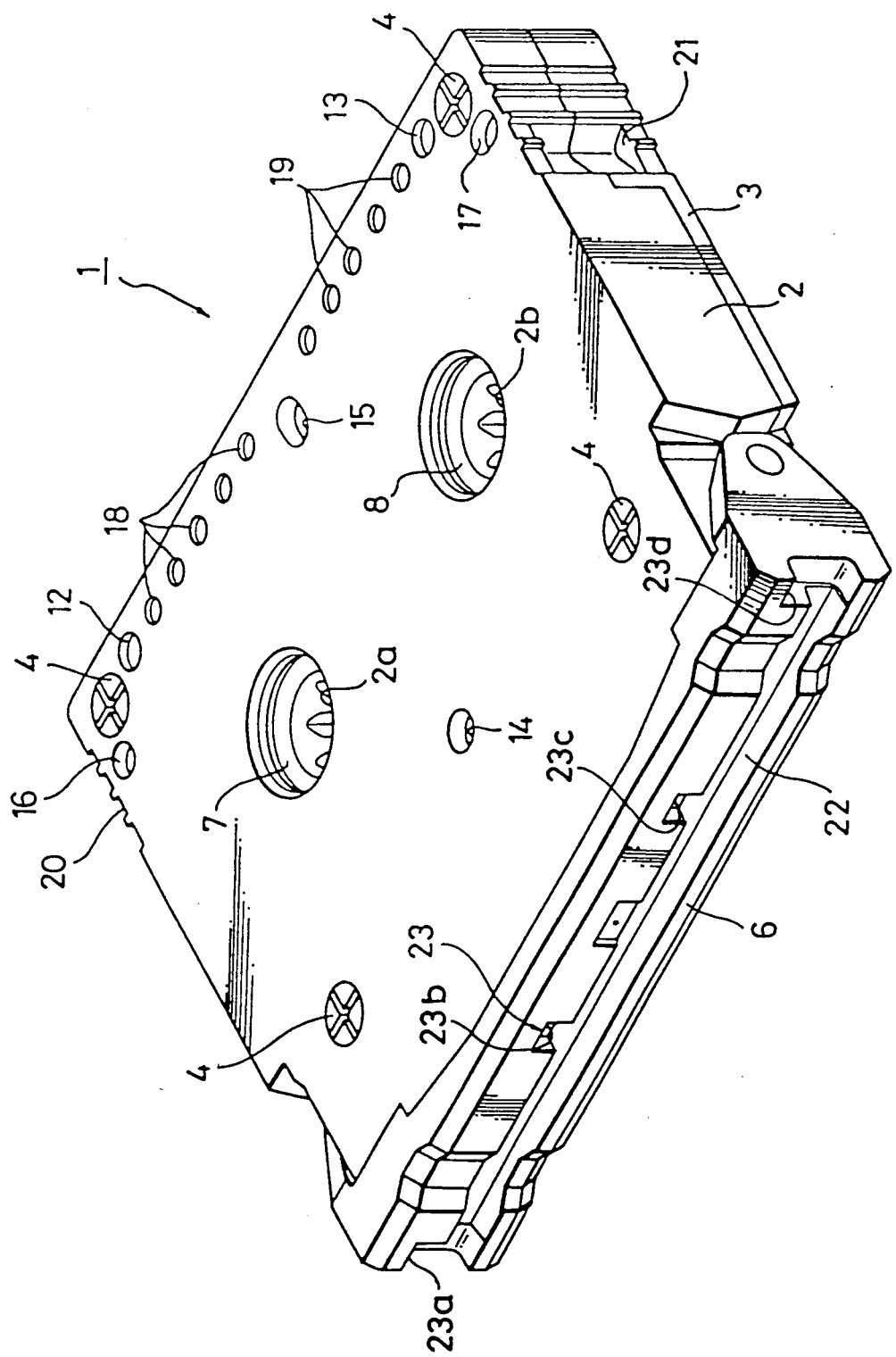
FIG. 5 is a perspective view showing an embodiment of the magnetic tape cassette according to the present invention.

An example of a magnetic tape cassette to which the present invention is applied will be explained with reference to FIGS. 1 to 10. The magnetic tape cassette of this embodiment is constructed as an extremely small magnetic tape cassette.

In FIGS. 1 to 10, reference numeral 1 generally designates a cassette casing which accommodates therein a magnetic tape on and from which, for example, a PCM (pulse code modulated) signal is recorded and reproduced. This cassette casing 1 is formed by fastening an upper half or upper part 2 and a lower half or lower part 3 by screws 4, and a lid 6 is pivotally supported to the cassette casing so as to cover and close an opening portion 5 formed on the front surface sides of both the upper and lower parts 2 and 3.

A magnetic tape T is accommodated within the cassette casing 1, i.e. between the upper and lower parts 2 and 3 under the condition such that the magnetic tape T is wound around a pair of reel hubs 7 and 8 provided in correspondence with hub drive shaft insertion apertures 2a, 2b and 3a, 3b. One portion of the magnetic tape T is exposed to the front surface side opening portion 5 under the condition such that the magnetic tape T is extended between pinch rollers 9 and 10 serving as guide rollers pivotally supported to both sides of the opening portion 5.

A braking mechanism 11 is provided within the cassette casing 1 to brake the two reel hubs 7 and 8 when this magnetic tape cassette is not in use. Erasure preventing mechanisms 12 and 13 are provided at the upper and lower surface sides of the cassette casing 1 at its two rear corner portions so as to communicate with the upper and lower parts 2 and 3. Positioning reference apertures 14, 15 and 16, 17 are formed through the cassette casing 1 at its central front and back portions in the front to back direction and at its two rear side portions in the lateral direction. A plurality of predetermined detection apertures 18 and 19 are formed through the cassette casing at its rear edge portion in the lateral direction. Further, grip portions 20 and 21 are formed on the rear portions of two side walls of the cassette casing 1.

A cassette changer engaging portion 23 (23a, 23b, 23c and 23d) is formed along a guide groove 22 extending along the lateral direction of the lid 6 which covers and uncovers the front surface side opening portion 5 of the cassette casing 1.

In the magnetic tape cassette thus arranged, the magnetic tape T accommodated within the cassette casing 1 is recorded and/or reproduced by a rotary head in a helical scan fashion.

Figure 6:
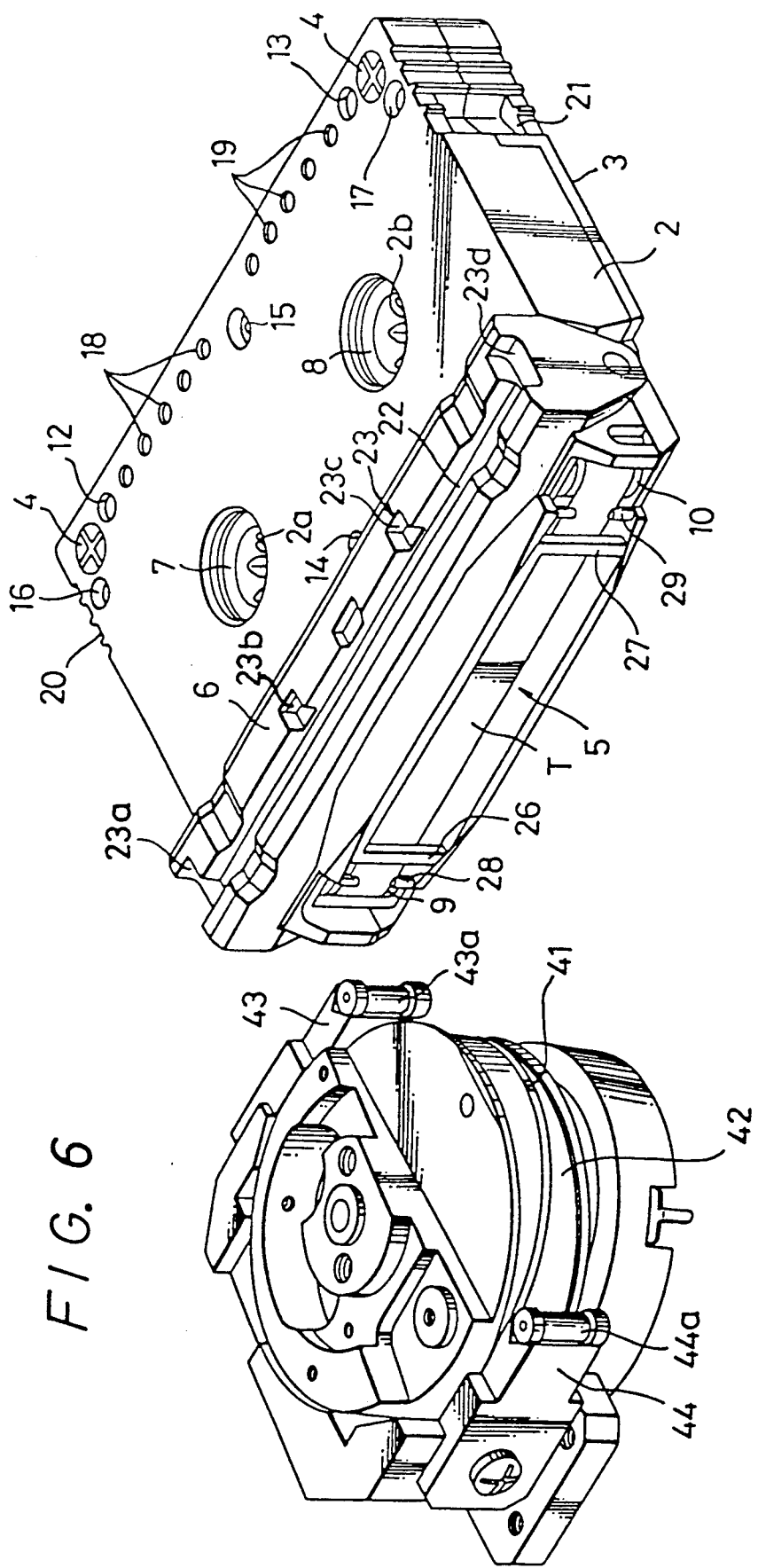
FIG. 6 is a perspective view of the magnetic tape cassette and a head drum of the present invention, and to which references will be made in explaining a relationship therebetween.

More specifically, as shown in FIG. 6, a rotary head 41 is rotated at a predetermined slant angle, relative to a head drum 42, and the head drum 42 is partially inserted into the front surface side opening portion 5 which is covered by rotating the lid 6 of the cassette casing 1 in the upper or lower direction. The magnetic tape T extended across the opening portion 5 is slidably moved so as to be wound around the peripheral surface of the head drum 42 that is inserted inside opening portion 5. Thus, when the rotary head 41 is rotated, slant tracks across the magnetic tape T are formed on the magnetic tape T.

Figure 7:
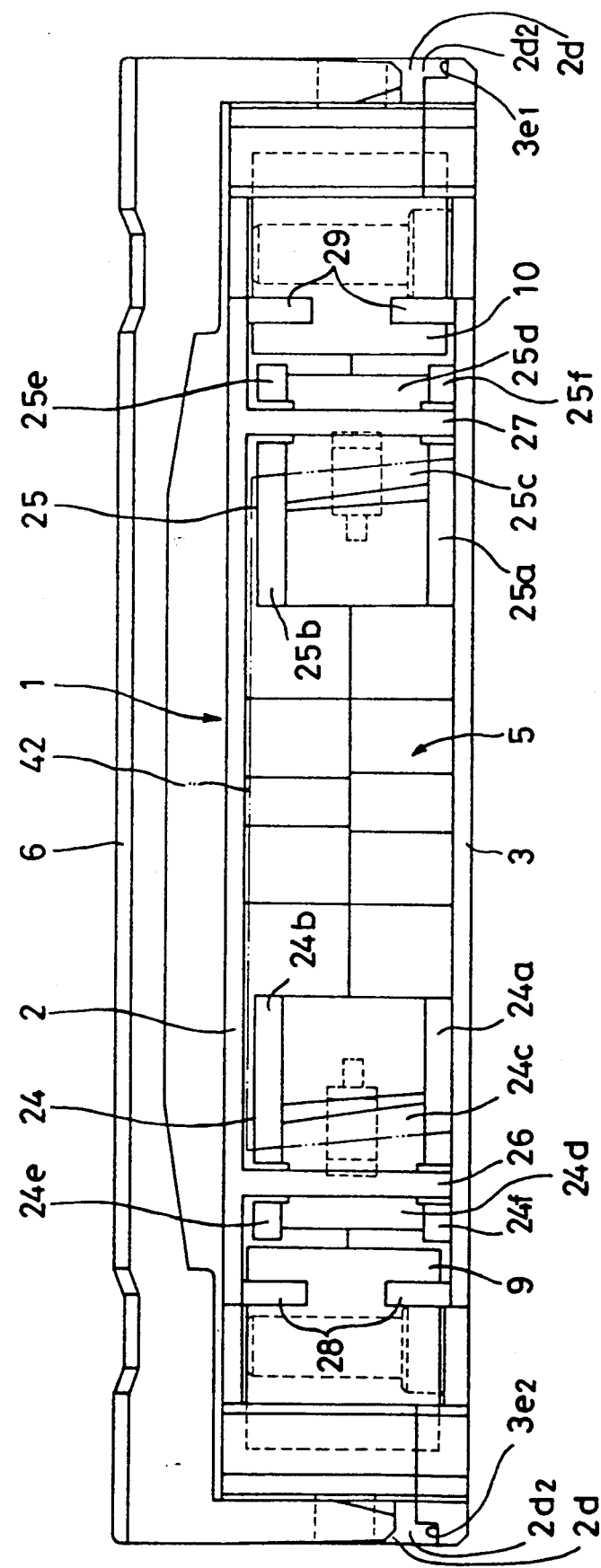
FIG. 7 is a front view of the magnetic tape cassette of the present invention and illustrating the condition such that a lid is opened.
Figure 8:
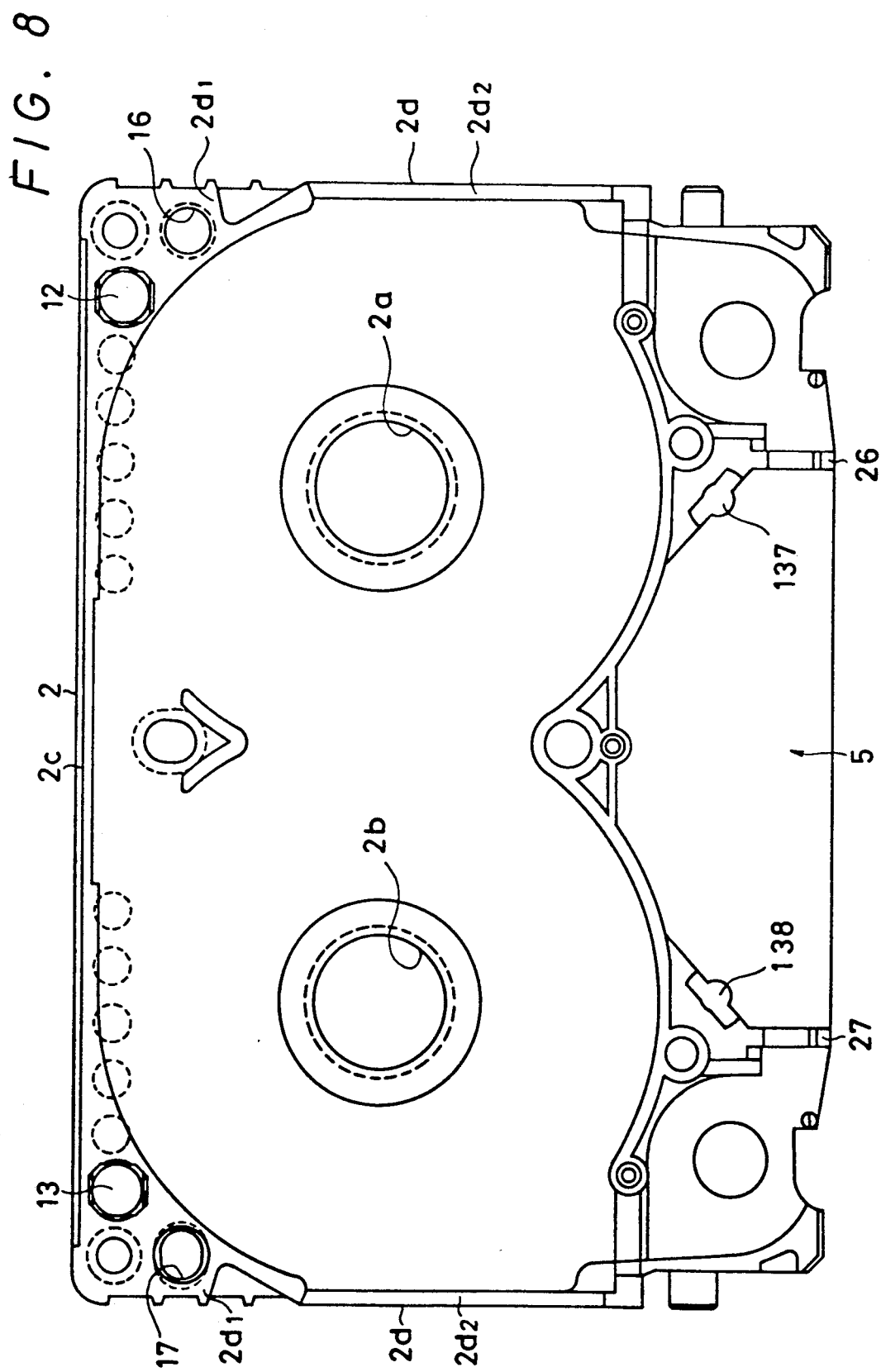
FIG. 8 is a plan view of the inside portion of the upper shell of the magnetic tape cassette.
Figure 9:
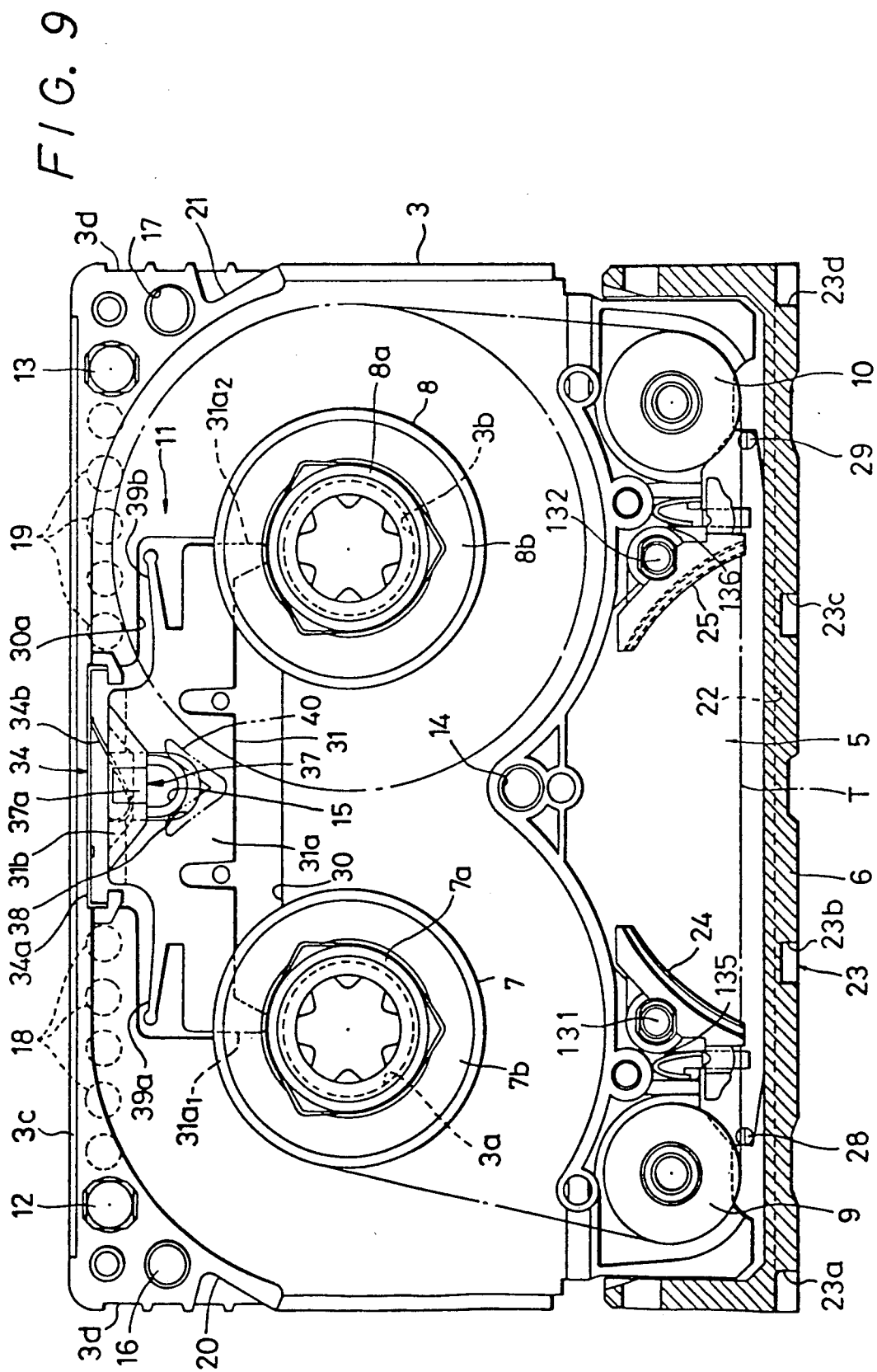
FIG. 9 is a plan view of the lower shell of the magnetic tape cassette.
Figure 10:
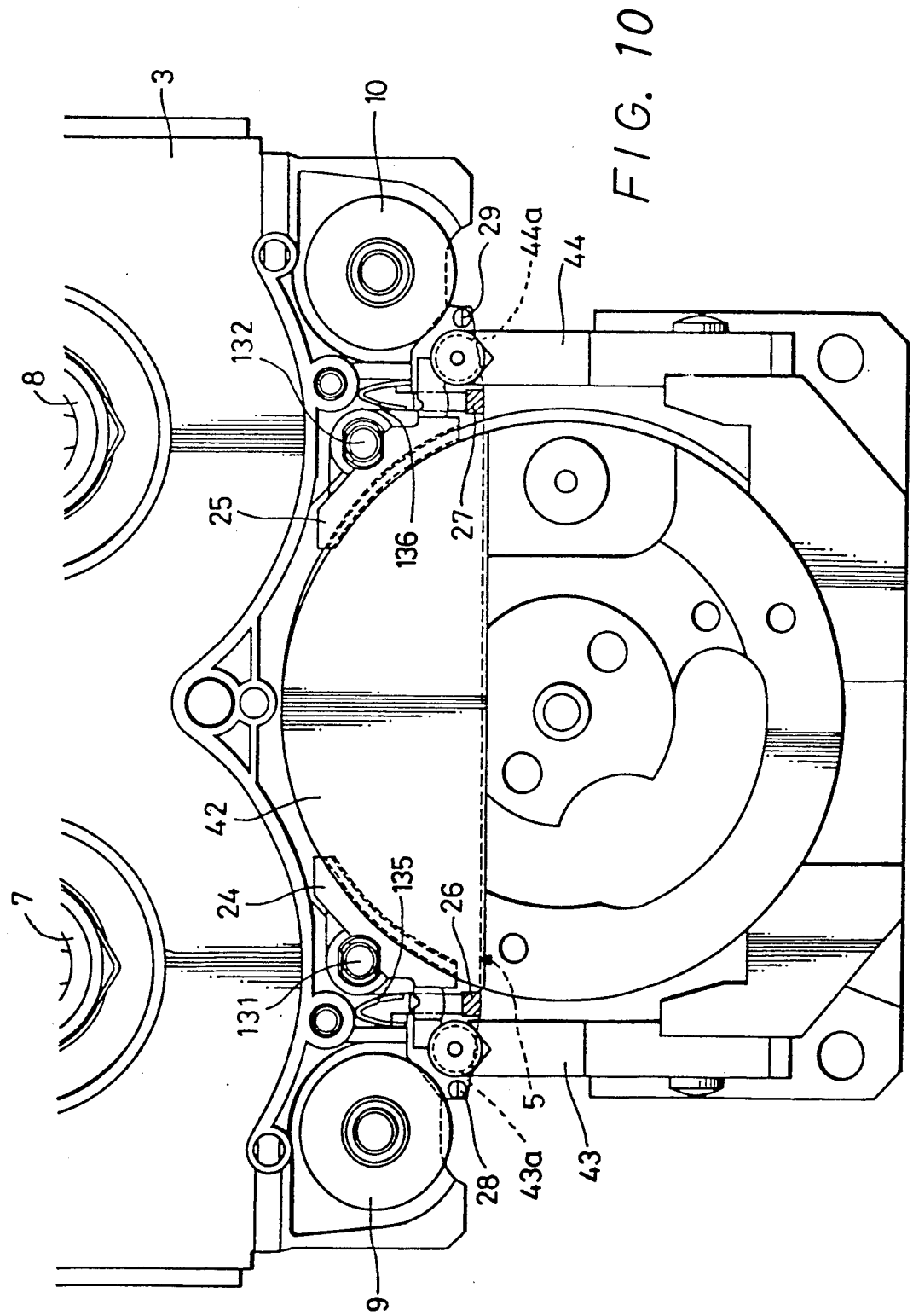
FIG. 10 is a fragmentary plan view of the lower shell and illustrating the condition such that the head drum is inserted into the lower shell.
Figure 11:
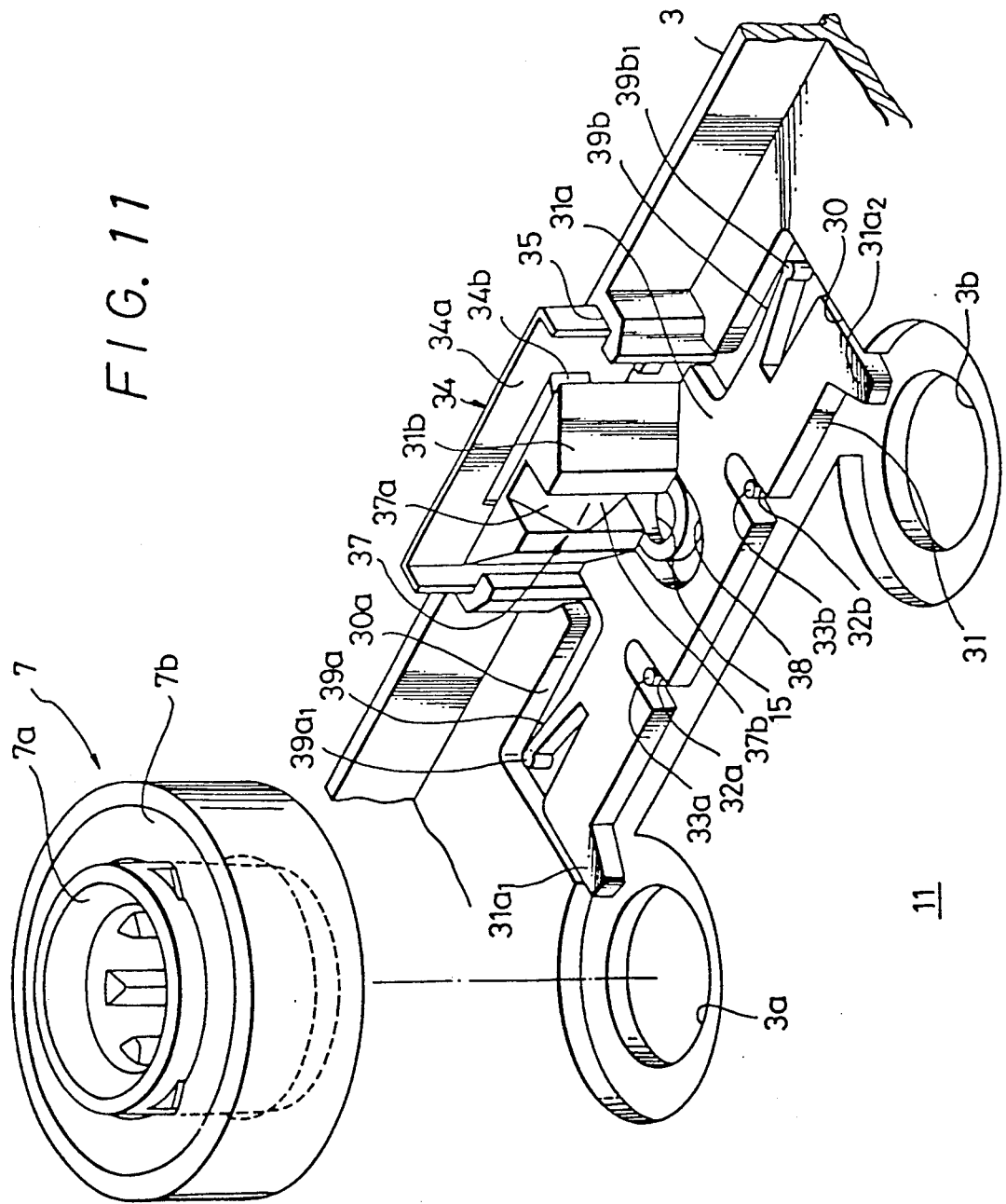
FIG. 11 is a perspective view of a braking mechanism of the magnetic tape cassette of the present invention.

In this embodiment, in order to ensure that the magnetic tape T is brought in slidable contact with the head drum 42 in a helical scan fashion, as shown in FIGS. 7, 9 and 10, a pair of tape guide members 24 and 25 whose guide portions are inclined in the opposite direction are disposed in the insertion portion of the opening portion 5 of the cassette casing 1 for the head drum 42 at their positions inside the guide rollers 9 and 10 such that the tape guide members 24 and 25 can be vibrated and moved in the lateral direction in an opposing fashion. When the head drum 42 is inserted into the opening portion 5, the tape guide members 24 and 25 come in contact with the peripheral surface of the head drum 42, and guide the magnetic tape T under the condition such that the magnetic tape T is sandwiched between them and the peripheral surface of the head drum 42.

Further, as shown in FIGS. 6 and 10, the head drum 42 has formed wing guides 43 and 44 at both its side portions which are inserted between the guide rollers 9, 10 and the tape guide members 24, 25 in both side portions of the opening portion 5 of the cassette casing 1. Rollers 43a and 44a are mounted on the front end portions of the two wing guides 43 and 44, and brought in slidable contact with the magnetic tape T, urging the magnetic tape T against the tape guide members 24 and 25.

The wing guides 43 and 44 are inserted into the opening portion 5 of the cassette casing 1 such that they are located between supporting members 26 and 27 provided near the inside of the opening portion 5 and tape projection preventing guide protrusions 28, 29, positioned between the supporting members 26 and 27 and the guide rollers 9 and 10.

The tape guide members 24 and 25 provided at the front surface opening portion 5 of the cassette casing 1 will be described more fully with reference to FIGS. 1 to 4 and 9.

As illustrated, the tape guide members 24 and 25 are symmetrically disposed at two sides of the front surface side opening portion 5 of the cassette casing 1, and the guide portions thereof are inclined in opposite direction.

Inner surfaces of the two tape guide members 24 and 25 are formed as inclined surfaces of arcuate configurations of diameters smaller than the diameter of the head drum 42 and which are inclined in opposite directions in the vertical direction. Protruded supporting edge portions 24a, 24b and 25a, 25b are formed on the upper and lower portions of the inclined inner surfaces of the tape guide members at a spacing slightly wider than a width of the magnetic tape T. Guide surfaces 24c and 25c are formed between these upper and lower supporting edge portions 24a, 24b and 25a, 25b. Vertical columnar guide surfaces 24d and 25d are formed on the front surface continuous to the inclined guide surfaces 24c and 25c. Front edge portions of supporting end edge portions 24a, 24b and 25a, 25b are slightly extended forward from the columnar guide surfaces 24d and 25d to form receiving edge portions 24a1, 24b1 and 25a1, 25b1, and engaging protrusions 24a2, 24b2 and 25a2, 25b2 are formed on the upper and lower opposing faces of the receiving edge portions 24a1, 24b1 and 25a1, 25b1. Further, pressing edge portions 24e, 24f and 25e, 25f are formed on the upper and lower portions of the outer ends of the columnar guide surfaces 24d and 25d in association with the receiving edge portions 24a1, 24b1 and 25a1, 25b$_1$, respectively. Concave portions 24e1, 24f1 and 25e1, 25f1 are formed on the front surfaces of the pressing edge portions 24e, 24f and 25e, 25f, respectively.

Further, bearing brackets 24g and 25g are protruded from the tape guide members 24 and 25 at their outer surface side of the guide surfaces 24c and 25c. Shaft apertures 24g1 and 25g1 of the bearing brackets 24g and 25g are shaped as rectangular apertures long in the lateral direction and protruded shaft support edges 24g2 and 25g2 are formed on the inner peripheral surfaces of the shaft apertures 24g1 and 25g1 at substantially the vertical midpoints thereof.

In the thus constructed tape guide members 24 and 25, the shafts 131 and 132 are inserted into shaft apertures 24g1 and 25g1 of the bearing brackets 24g and 25g and are protruded at the front surface side opening portion 5 of the cassette casing 1, that is, at two side portions of the front opening portion forming surface of the front wall of the lower shell 3, and the lower surface sides of the bearing brackets 24g and 25g are placed on holding members 133 and 134 formed around the base portions of the shafts 131 and 132, whereby the lower surface sides of the tape guide members 24 and 25 are supported under the condition such that they are raised above the inner surface of the lower shell 3 with a predetermined spacing. Therefore, the tape guide members 24 and 25 can be rotated relative to the shafts 131 and 132 and also can be inclined in the lateral direction, or pivoted about connecting points between the support edges 24g2 and 25g2 of the shaft apertures 24g1 and 25g1 and the shafts 131 and 132. Further, the tape guide members 24 and 25 can be moved in the lateral direction by the oblong apertures 24g1 and 25g1.

The two tape guide members 24 and 25 are spring-biased in the central direction of the opening portion 5 by springs 135 and 136 supported on a supporting portion 130 implanted on the inner surface of the lower shell 3. Further, the upper surface sides of the bearing brackets 24g and 25g are pushed by pushing members 137 and 138 formed on the inner surface of the upper shell 2, whereby the upper surface sides of the two tape guide members 24 and 25 are separated from the inner surface of the upper shell 2.

As described above, the magnetic tape T tensioned between the guide or pinch rollers 9 and 10 is brought in slidable contact with the front surfaces of the two tape guide members 24 and 25 provided at two side portions of the front surface side opening portion 5 of the cassette casing 1.

More specifically, the magnetic tape T is extended through the inside of the supporting members, 26, 27 and the guide protrusions 28, 29 between the guide rollers 9 and 10. Then, the magnetic tape T is brought in slidable contact with the vertical columnar guide surfaces 24d and 25d of the two guide members 24 and 25 so that the magnetic tape T is sandwiched between the receiving edge portions 24a1, 24b1 and 25a1, 25b1 of the front elongated portions of the support edge portions 24a, 24b and 25a, 25b and the inside of the engaging protrusions 24a2, 24b2 and 25a2, 25b2.

Therefore, even when the magnetic tape T is slackened between the guide rollers 9 and 10, the magnetic tape T can be prevented from being disengaged from the two tape guide members 24 and 25.

When the tape cassette in which the magnetic tape T is housed as set forth above is loaded onto the recording and reproducing apparatus (not shown) which performs the recording or reproduction, the lid 6 of the cassette casing 1 is rotated in its lid opening direction to thereby uncover the opening portion 5. Under this condition, the head drum 42 is moved in unison with the two wing guides 43 and 44 and inserted into the opening portion 5 under the condition that the head drum 42 is in slidable contact with the magnetic tape T. Also, the front ends of the wing guides 43 and 44 are inserted between the supporting members 26, 27 and the guide protrusions 28, 29.

Then, the head drum 42 comes in slidable contact with the supporting edge portions 24a, 24b and 25a, 25b of the two tape guide members 24 and 25 which can be swung and moved in the lateral direction, that is, which can be moved freely within the opening portion 5 of the cassette housing 1. Depending on the orientation of the two tape guide members 24 and 25, the head drum 42 comes in contact with any one of the front end surfaces or rear end surfaces of the supporting edge portions. When the head drum 42 is inserted into the predetermined position of the opening portion 5, one side of the front or rear end surfaces is pushed and one tape guide member is rotated about its shaft support portion by the shafts 131 and 132 so that the other tape guide is brought in contact with the circumferential surface of the head drum 42.

When head drum 42 comes in contact with one of the upper and lower sides of the supporting edge portions 24a, 24b and 25a, 25b of the two tape guide members 24 and 25, the supporting edge portions are pushed so that one tape guide member is rotated with an inclination about the contact portions in which the shaft support edges 24g2, 25g2 of the bearing brackets 24g, 25g come in contact with the shafts 131, 132 and the other tape guide member is brought into circumferential contact with the head drum 42.

Further, when the spacing between the two tape guide members 24 and 25 is small, by the insertion of the head drum 42, the two tape guide members 24 and 25 are moved in the lateral direction relative to the shafts 131 and 132 within the oblong shaft apertures 24g1, 25g1 of the bearing brackets 24g and 25g against the spring-biasing forces of the springs 135 and 136. Thus, the supporting edge portions 24a, 24b and 25a, 25b are brought in circumferential contact with the head drum 42.

As described above, when the head drum 42 is inserted into the opening portion 5 of the cassette casing 1, the two tape guide members 24 and 25 reliably come in contact with the peripheral surface of the head drum 42 at the supporting edge portions 24a, 24b and 25a, 25b and the front and rear ends thereof.

On the other hand, when the front end portions of the two wing guides 43, 44, i.e. rollers 43a, 44a are inserted between the supporting members 26, 27 and the guide protrusions 28, 29, the two tape guides 24 and 25 come in rotatable contact with the magnetic tape T, and the flanges 43b, 43c and 44b, 44c supporting the rollers 43a and 44a come in contact with the pressing edge portions 24e, 24f and 25e, 25f of the two tape guide members 24 and 25 and are in engagement with the concave portions 24e1, 24f1 and 25e1, 25f1 thereof, whereby the two tape guide members 24 and 25 are kept parallel to the head drum 42 in the front to rear direction.

At a point in time in which the head drum 42 is inserted into the opening portion 5 of the cassette casing 1, the horizontal positions of the two tape guide members 24 and 25 are determined by the contact of the two wing guides 43 and 44 with the pressing edge portions, 24e, 24f and 25e, 25f. Further, the vertical orientation of the two tape guide members 24 and 25 are determined by the contact of the head drum 42 with the supporting edge portions 24a, 24b and 25a, 25b. Under this condition, the magnetic tape T is brought in slidable contact with the vertical columnar guide surfaces 24d, 25d and the inclined guide surfaces 24c, 25c between the supporting edge portions 24a, 24b and 25a, 25b so that the magnetic tape T is set at the position of the ideal tape path relative to the head drum 42.

The magnetic tape T, which is extended between the pinch rollers 9 and 10, is engaged with the engaging protrusions 24a2, 24b2 and 25a2, 25b2 between the receiving edge portions 24a1, 24b1 and 25a1, 25b1 of the two tape guide members 24 and 25 so that, when the head drum 42 is inserted into the opening portion 5, the tape T is brought in slidable contact with the circumferential surface of head drum 42 and is pushed inside of the opening portion 5. Therefore, the tape T is reliably brought in slidable contact with the inclined guide surfaces 24c and 25c between the supporting edge portions 24a, 24b and 25a, 25b of the two tape guide members 24 and 25. There is then no risk that the contact portions of the supporting edge portions 24a, 24b and 25a, 25b of the two tape guide members 24 and 25 come in contact with the head drum 42, that is, the chucking portion catches the magnetic tape T. Therefore, the magnetic tape T can be smoothly transported along the aforementioned tape path.

In the two tape guide members 24 and 25 which form the tape path as described above, the vertical columnar guide surfaces may be formed of independent columnar guide members and may be secured to the cassette casing side.

In the upper and lower shells 2 and 3 forming the cassette casing 1 of this embodiment, the height of the upper shell 2 is selected to be substantially half of the thickness of the cassette casing 1 in a range of from the rear wall surface 2c to the rear portions 2d1 and 2d1 of the two side wall surfaces 2d, 2d and the height of the portion except for the rear portions 2d1, 2d1 of the two side wall surfaces 2d, 2d is also selected to be substantially equal to the thickness of the cassette casing 1, i.e. the height forming the entire side surface of the cassette casing 1. On the other hand, the height of the lower shell 3 is selected to be substantially half of the thickness of the cassette casing 1 in a range of from the rear wall surface 3c to the two side rear wall surfaces 3d, 3d corresponding to the two side wall surface rear portions 2d1, 2d1 of the upper shell 2. Except for these two side rear wall surfaces 3d, 3d the surfaces in which the hub drive shaft insertion apertures 3a, 3b are formed are shaped as flat portions which are open in the two side directions. Further, engaging stepped portions 2d2, 2d2 are formed on the end edge portions of the two side wall surfaces 2d, 2d of the upper shell 2, and engaging stepped portions 3e1, 3e2 are formed on two side edges of the lower shell 3 in correspondence with the engaging stepped portions 2d2, 2d2.

The upper and lower shells 2 and 3 are joined and fastened such that the rear wall surfaces 2e, 3e, the rear portions 2d1, 2d1 of the two side wall surfaces 2d, 2d and the end edge surfaces of the two side rear wall surfaces 3d, 3d abut each other and the end edge engaging stepped portions 2d2, 2d2 of the two side wall surfaces 2d, 2d of the upper shell 2 and the engaging stepped portions 3e1, 3e2 of the two side edges of the lower shell 3 are engaged with each other, thereby forming the cassette casing 1.

In the assembly-process in which the magnetic tape T is housed in the thus constructed cassette casing 1, the lower shell 3 has no side wall and is shaped flat so that the reel hubs 7 and 8 around which the magnetic tape T is wound can be loosely engaged with the hub apertures 3a, 3b of the lower shell 3 from the lateral direction with no trouble, which provides excellent workability and also makes the automatic assembly possible. Thus, the production efficiency can be increased. Further, the cassette casing 1 itself can become more airtight by engaging the end edge engaging stepped portions 2d2, 2d2 of the two side wall surfaces 2d, 2d of the upper shell 2 with the engaging stepped portions 3e1, 3e2 of the two side edges of the lower shell 3, and also strength of the cassette casing 1 can be increased.

The arrangement of the braking mechanism 11 in the thus arranged magnetic tape cassette will be explained with reference to FIG. 9 and FIGS. 11 to 13.

As illustrated, a recess portion 30 of substantially rectangular configuration is formed on the bottom surface of the lower part 3 at its rear central portion. A braking member 31 is accommodated within this recess portion 30 such that the braking member 31 can be freely moved in the front to rear direction, that is, in the direction in which the braking member 31 approaches or moves away from the reel hubs 7 and 8.

Figure 12:
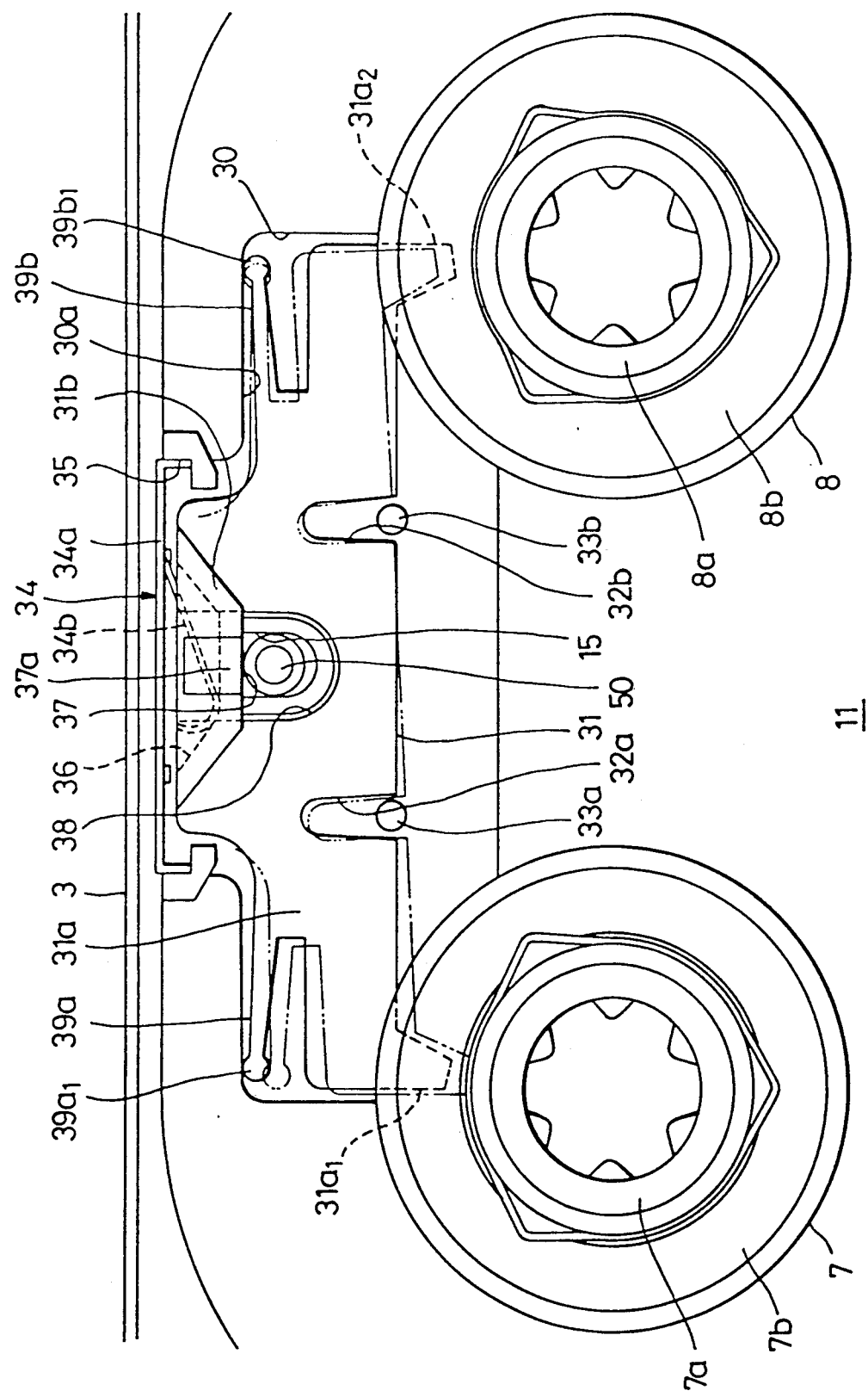
FIG. 12 is a plan view of the magnetic tape cassette and illustrating the condition that the reel hubs are released from being locked by the braking mechanism.

As shown in the figures, this braking member 31 is composed of a flat plate portion 31a which is flush with the bottom surface of the recess portion 30 and a protruded wall portion 31b erected from the rear portion of the flat plate portion 31a. A pair of protruded nail members 31a1 and 31a2 are protruded from the front portion of the flat plate portion 31a so as to correspond with the two reel hubs 7 and 8 as shown in FIG. 12. The top portions of the protruded nail, members 31a1 and 31a2 are urged against the reel hubs 7 and 8, thereby locking the rotation of the two reel hubs 7 and 8, as will be described later.

The reel hubs 7 and 8 are comprised of inner hubs 7a and 8a with which hub drive shafts are engaged and outer hubs 7b and 8b which can be moved in the axial directions relative to the inner hubs 7a and 8a and which can be engaged with the inner hubs 7a and 8a in the circumferential direction thereof. The protruding nail members 31a1 and 31a2 of the braking member 31 are urged against the peripheral surfaces of the inner hubs 7a and 8a extending past the lower surfaces of the outer hubs 7b and 8b, respectively.

A pair of left and right guide slits 32a and 32b of recess configurations are formed on the central portion of the flat plate portion 31a so as to extend from the front edge of the flat plate portion 31a to its rear direction. A pair of guide pins 33a and 33b are projected from the bottom surface of the recess portion 30 in correspondence with the pair of guide slits 32a and 32b. The guide slits 32a and 32b are guided by the guide pins 33a and 33b, whereby the moving direction of the braking member 31 is restricted.

A plate spring 34 is provided at the rear side of the braking member 31 to spring-bias the braking member 31. This plate spring 34 is composed of a main plate portion 34a and an arm portion 34b erected from the central portion of the main plate portion 34a. The main plate portion 34a is engaged with a spring accommodating portion 35 provided at the rear side wall inner surface side of the lower part 3, and the arm portion 34b is engaged at its top portion with a concave portion 36 formed on the rear surface side of the vertically-projected portion 31b as shown in FIG. 12. Thus, the braking member 31 is always spring-biased in the forward direction, i.e. in the direction in which the protruded nail members 31a1 and 31a2 are urged against the peripheral surfaces of the inner hubs 7a and 7b.

The vertically-protruded wall portion 31b of the braking member 31 has on its central front surface side a pressing operation portion 37 which allows the braking member 31 to perform the hub lock releasing operation. This pressing operation portion 37 is formed as a mountain-configuration whose central portion is high in cross-sectional side view, that is, this pressing operation portion 37 has inclined cam surfaces 37a and 37b whose cam surfaces are symmetrically inclined rearwardly toward the upper to lower sides from the central portion. When this pressing operation portion 37 is pressed by the lock releasing pin inserted into an insertion aperture bored through the two upper and lower parts 2 and 3, the braking member 31 is moved in the rear direction, thereby the reel hubs being released from their locked conditions.

In this embodiment, one of the positioning reference apertures of the cassette casing 1, i.e. the reference aperture 15 at the rear and central portion of the cassette casing 1 in its front to rear direction is used so that, when this magnetic tape cassette is loaded into the cassette tape recorder, a cassette tape recorder side positioning pin 50 inserted into the reference aperture 15 is used as the lock releasing pin or the hub lock releasing operation of this braking member 31 is performed by this positioning pin 50.

An opening 38 elongated in the front to rear direction is formed through the central portion of the flat plate portion 31a of the braking member 31 in correspondence with the reference aperture (insertion aperture) 15, and this opening 38 is employed as a portion in which the positioning pin (lock releasing pin) 50 inserted from the lower half 3 side is engaged.

A pair of left and right protruded portions 39a and 39b are symmetrically protruded from both sides of the flat plate portion 31a of the braking member 31 at its rear portion in the lateral direction. The protruded portions 39a and 39b are made to have a predetermined resiliency so that, if the braking member 31 is abnormally operated during an inclined fashion in the hub lock releasing operation, any one of top circular-shaped portions 39a1 and 39b1 of the two protruded portions 39a and 39b comes in contact with a rear side edge surface 30a of the recess portion 30, thus the braking member 31 being returned to the normal hub lock releasing condition.

In this braking mechanism 11, a supporting column member 40 is projected from the inner surface side of the upper part 2 to the lower direction and the lower end face of the support column member 40 is faced to the central portion of the flat plate portion 31a of the braking member 31. The braking member 31 is always restricted by this support column member 40 so that it can be prevented from being disengaged from the recess portion 30.

Figure 13A:
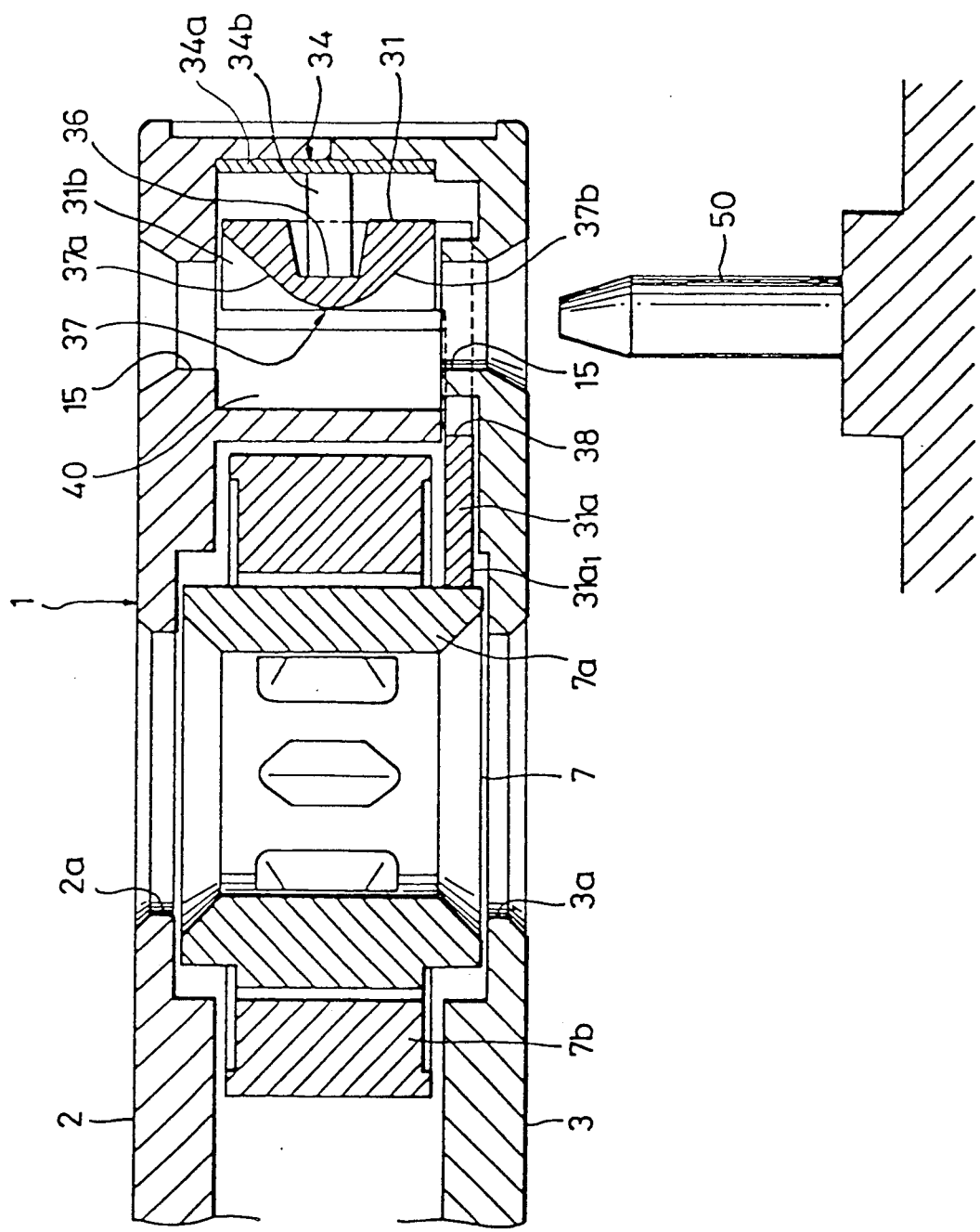
FIGS. 13A and 13B are cross-sectional views used to explain the operation of the present invention, respectively.
Figure 13B:
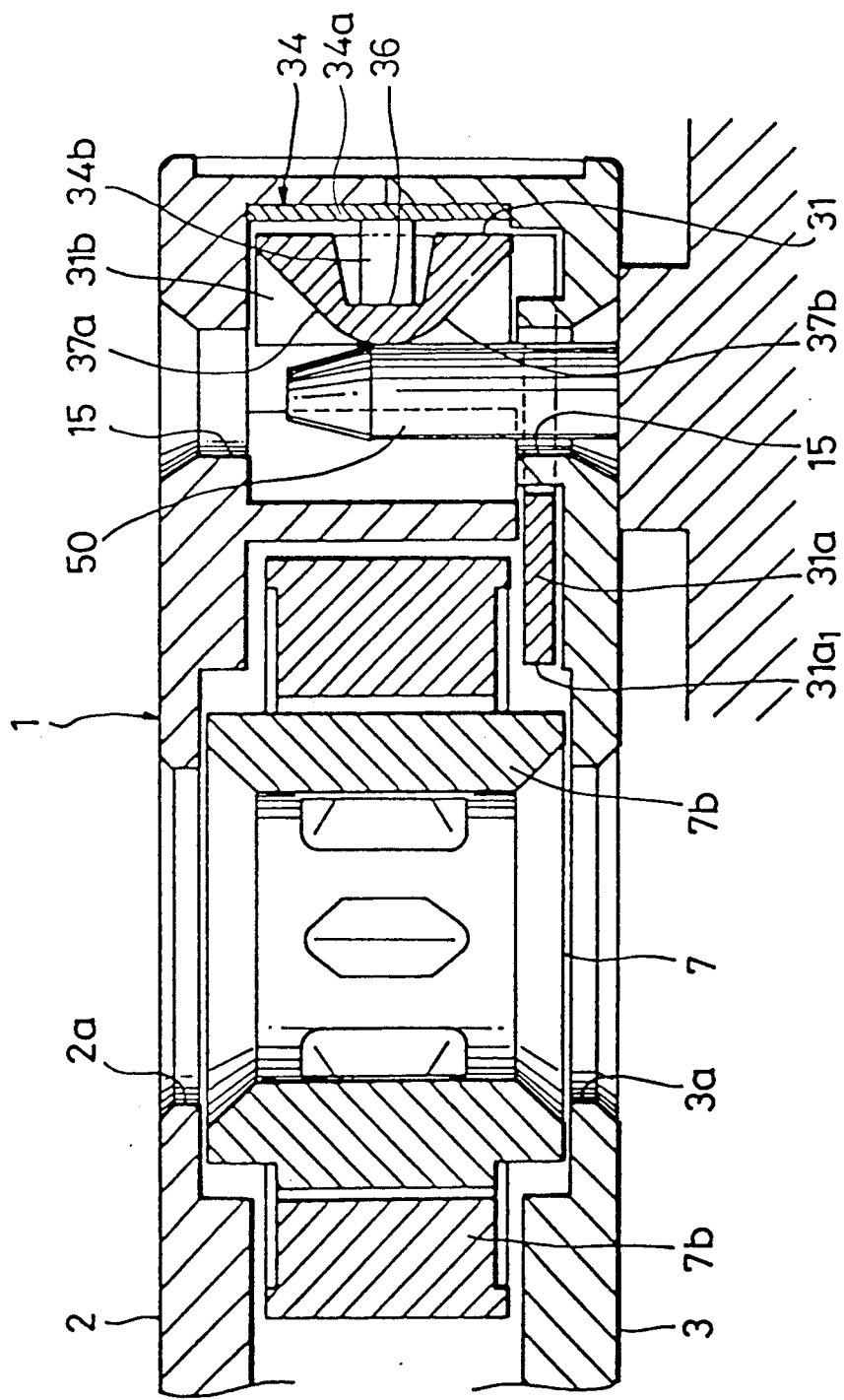

As will be clear from the above-mentioned arrangement, according to the braking mechanism 11 of the magnetic tape cassette of this embodiment, in the normal condition, or when the magnetic tape cassette is not in use, the protruded nail members 31a1 and 31a2 of the braking member 31 are urged against the outer peripheral surfaces of the inner hubs 7a and 8a of the two reel hubs 7 and 8 by the spring-biasing force of the plate spring 34, whereby the two reel hubs 7 and 8 are locked and hence they can be prevented from being rotated by a certain amount of shock (see FIGS. 9 and 13A).

When the magnetic tape cassette is loaded onto the cassette tape recorder, the cassette tape recorder side positioning pin 50 is inserted into the reference aperture 15 (in actual practice, the cassette casing 1 is lowered and the reference aperture 15 is engaged with the positioning pin 50), the positioning of the cassette casing 1 is performed and the hub lock releasing operation by the braking member 31 is simultaneously performed.

The hub lock releasing operation by the braking member 31 can be performed from any side of the upper part 2 and the lower part 3. That is, when the magnetic tape cassette is loaded onto the cassette tape recorder under the condition such that the upper part 2 side (so-called side A) thereof is oriented above as shown in FIG. 13A, the positioning pin 50 inserted into the reference aperture 15 of the lower part 3 side presses the inclined cam surface 37b of one side (lower side in FIG. 13A) of the pressing operation portion 37 so that the braking member 31 is moved rearwards against the spring-biasing force of the plate spring 34, that is, the braking member 31 is moved in the direction in which the protruded nail members 31a1 and 31a2 separate from the inner hubs 7a and 8a of the reel hubs 7 and 8 (see FIGS. 12 and 13B). Conversely, when the magnetic tape cassette is loaded onto the cassette tape recorder under the condition such that the cassette casing 1 is turned over and the lower part 3 side (so-called side B) is oriented above, the positioning pin 50 inserted into the reference aperture 15 of the upper part 2 side presses the inclined surface 37a of the other side of the pressing operation portion 37, whereby the braking member 31 is moved in the rear direction similarly as described above, thus the reel hubs 7 and 8 being released from their locked conditions, or the reel hubs 7 and 8 being allowed to rotate freely.

In the hub lock releasing operation of the braking member 31, the braking member 31 is operated by pressing one point of the central portion of the braking member 31. There is then the substantial risk that the braking member 31 is frequently operated in an unbalanced fashion and is moved in the inclined condition as shown by a two-dot chain line in FIG. 12, thus the braking member 31 being placed in a so-called deviated condition where only one protruded nail member is brought in contact with the reel hub and does not separate from the reel hub. In that case, according to the magnetic tape cassette of this embodiment, the top circular-shaped portion of any one of the left and right protruded portions (the top circular-shaped portion 39b1 of the right protruded portion 39b in the example of FIG. 12) comes in contact with the rear side edge surface 30a of the recess 30, whereby the braking member 31 is returned to the normal condition that the two protruded nail members 31a1 and 31a2 correspond with the reel hubs 7 and 8 in a well-balanced condition by virtue of the cushion-action of the protruded portions. Thus, the two protruded nail members 31a1 and 31a2 separate from the reel hubs 7 and 8 together, or the braking member 31 can be protected from the above-mentioned defect and the two reel hubs 7 and 8 can be released from their locked conditions.

Under the condition that the reel hubs 7 and 8 are positively released from being locked by the braking member 31, the reel hubs 7 and 8 are rotated by the driving of the hub drive shafts (not shown) of the cassette tape recorder, thereby the magnetic tape T being transported.

As described above, according to the magnetic tape cassette of this embodiment, the hub lock releasing operation by the braking member can be performed from any of the upper part 2 side and the lower part 3 side of the cassette casing 1. Therefore, the magnetic tape cassette of this invention can be applied to a double-sided use type where the cassette casing 1 is turned over and the recording and reproduction can be performed in a reciprocating fashion.

Since the positioning reference aperture 15 of the cassette casing 1 is utilized as the pin insertion aperture into which the pin 50 for operating the braking member 31 is inserted, insertion apertures need not be bored respectively through the upper and lower parts 2 and 3 of the cassette casing 1, which saves the space of the cassette casing 1 from a design standpoint. This is very effective for the extremely small magnetic tape cassette of this embodiment in which the space of the cassette casing 1 is restricted. Also, in the cassette tape recorder side, the lock releasing pin for operating the braking member 31 is not needed and the positioning of the cassette casing 1 as the hub lock releasing operation of the braking member 31 are simultaneously performed by the positioning pin 50 which performs the positioning of the cassette casing 1. Therefore, the assembly parts on the cassette tape recorder side can be reduced and the mechanism of the cassette tape recorder can be simplified.

Further, since the braking member 31 is abnormally operated in the inclined condition and placed in the single-returned condition during the hub lock releasing operation, the braking member 31 can be returned to the normal condition by the cushion action of any one of the left and right protruded portions 39a and 39b, thereby ensuring that the hub lock releasing operation is always performed positively. Therefore, in the recording or reproducing operation, the reel hubs 7 and 8 can be smoothly rotated without any resistance to ensure that the magnetic tape T can be stably transported.

Thus, the magnetic tape cassette of the present invention can bring about various advantages unlike the prior art.

Figure 14:
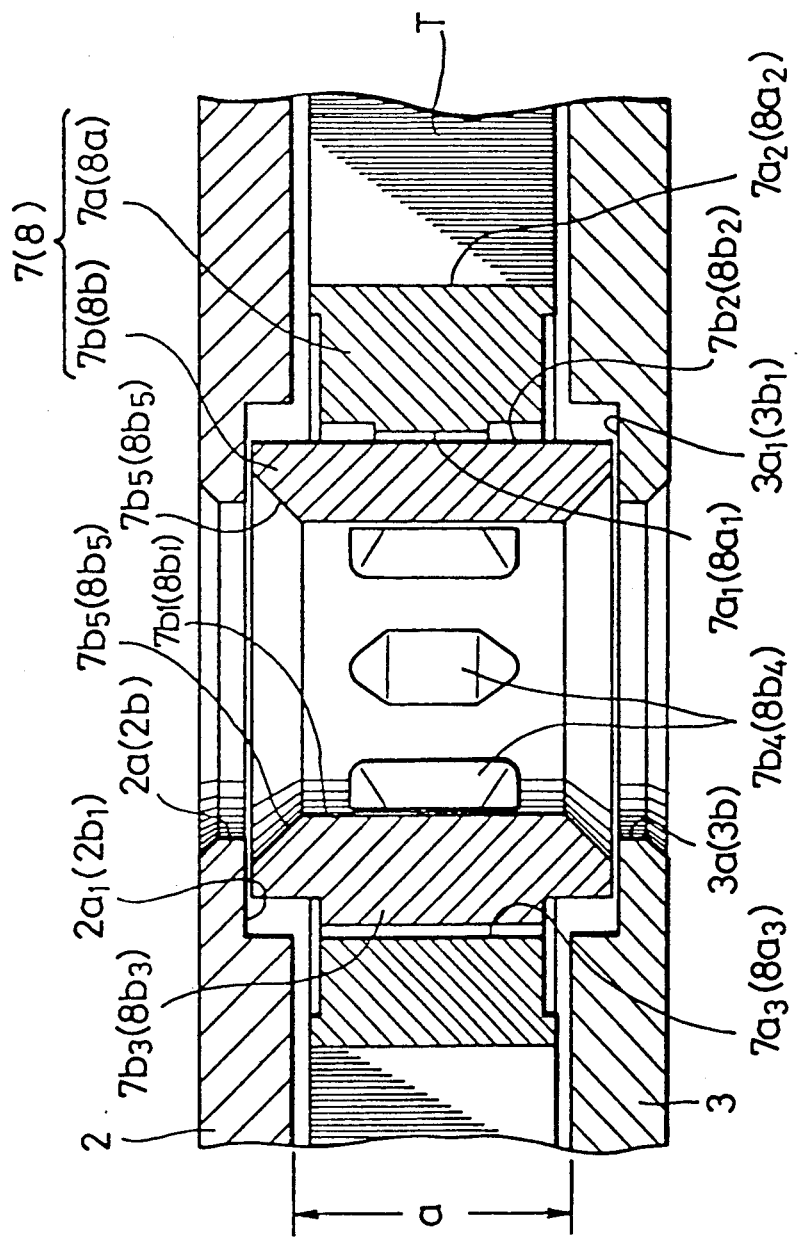
FIG. 14 is a cross-sectional view of the reel hub used in the magnetic tape cassette of the present invention.

The reel hubs 7, 8 and their associated parts will now be described in detail with reference to FIG. 14. The reel hubs 7, 8 are structurally identical to each other, and only the reel hub 7 and its associated parts are shown in FIG. 14, with only reference characters of the other reel hub 8 and its associated parts being added in parentheses.

The reel hubs 7, 8 comprise respective outer hub members 7a, 8a and respective inner hub members 7b, 8b. The outer hub members 7a, 8a are in the form of drums and have respective inner circumferential surfaces 7a1, 8a1. The inner hub members 7b, 8b, which are of a hollow cylindrical shape, are axially slidably fitted in the outer hub members 7a, 8a, respectively, and have respective outer circumferential surfaces 7b2, 8b2 which are held in circumferential engagement with the inner circumferential surfaces 7a1, 8a1, respectively, so that the outer hub members 7a, 8a and the inner hub members 7b, 8b are rotatable in unison with each other. The outer hub members 7a, 8a have respective outer circumferential surfaces 7a2, 8a2 around which the magnetic tape T is wound. The inner hub members 7b, 8b have respective inner circumferential surfaces 7b1, 8b1 defining axial holes in which the hub drive shafts will be inserted.

The inner circumferential surfaces 7a1, 8a1 of the outer hub members 7a, 8a have a plurality of axial engaging recesses 7a3, 8a3 spaced at intervals in the circumferential direction. The inner hubs 7b, 8b have an outside diameter larger than the inside diameter of the holes 2a, 3a, 2b, 3b for receiving the hub drive shafts, and a height or axial length slightly larger than the inner width of the cassette casing 1, i.e. the distance a between the inner surfaces of the upper and lower shells 2, 3. The outer circumferential surfaces 7b2, 8b2 of the inner hubs 7b, 8b have a plurality of axial engaging teeth 7b3, 8b3 which are axially movable with respect to, but circumferentially engage in the axial engaging recesses 7a3, 8a3 for circumferential movement in unison, the outer hub members 7a, 8a and the inner hub members 7b, 8b are axially slidable with respect to each other, but held in rotational engagement with each other for circumferential movement in unison with each other. The inner circumferential surfaces 7b1, 8b1 of the inner hub members 7b, 8b have a plurality of circumferentially spaced engaging teeth or ridges 7b4, 8b4 which will be engaged by similar engaging teeth or ridges on the hub drive shafts. The inner hub members 7b, 8b have tapered guide surfaces 7b5, 8b5 on axially opposite open ends thereof, which are contiguous to the inner circumferential surfaces 7b1, 8b1, and progressively inclined radially inwardly toward the inner circumferential surfaces 7b1, 8b1.

The upper and lower shells 2, 3 have circular recesses or stepped surfaces 2a1, 2b1 and 3a1, 3b1 defined in the inner surfaces thereof in coaxial surrounding relation to the holes 2a, 2b and 3a, 3b, respectively. The circular recesses 2a1, 2b1 and 3a1, 3b1 are of a diameter larger than the outside diameter of the axial open ends of the inner hub members 7b, 8b. The circular axial open ends of the inner hub members 7b, 8b are loosely fitted respectively in the circular recesses 2a1, 2b1 and 3a, 3b1, so that the inner hub members 7b, 8b are rotatably supported between the upper and lower shells 2, 3.

The reel hubs 7, 8 are housed in their entirety between the upper and lower shells 2, 3 and are therefore concealed in the cassette casing 1 for protection against direct access by fingers from the outer surfaces of the upper and lower shells 2, 3. Therefore, the reel hubs 7, 8 are prevented from being inadvertently turned by fingers from outside of the cassette casing 1. Since the outside diameter of the inner hub members 7b, 8b, which define the holes for receiving the hub drive shafts, is larger than the inside diameter of the holes 2a, 2b and 3a, 3b in the upper and lower shells 2, 3, and also since the inner hub members 7b, 8b have tapered guide surfaces 7b5, 8b5, the hub drive shafts can smoothly be guided and inserted through the holes 2a, 2b and 3a, 3b into the holes in the inner hub members 7b, 8b, without directly hitting the reel hubs 7, 8. The reel hubs 7, 8 and the hub drive shafts are thus protected against damage when the magnetic tape cassette is loaded into the magnetic tape recording and reproducing apparatus.

The inside diameter of the holes in the reel hubs 7, 8 for receiving the hub drive shafts can be selected as desired without direct bearing on the holes 2a, 2b and 3a, 3b in the upper and lower shells 2, 3. Therefore, the hubs 7, 8 can be constructed with less design limitations and hence manufactured with ease.

In the tape cassette arranged as described above, erasure preventing mechanisms 12 and 13 disposed in the cassette casing 1 will be described in detail with reference to FIGS. 15 to 17. Since the two erasure preventing mechanisms 12 and 13 are constructed the same, one erasure preventing mechanism 12 is illustrated and the other erasure preventing mechanism 13 therefore need not be shown in FIGS. 15 to 17.

In each of the erasure preventing mechanisms 12 and 13, an erasure preventing detection sliding member (hereinafter simply referred to as a protective plug) 231 is slidably inserted into an insertion aperture 232 which is bored through the cassette casing 1 at its rear side portion in the thickness direction of the cassette casing 1.

The protective plug 231 is molded of synthetic resin or the like which has flexibility to be deformed. The length of this protective plug 231 is shorter than that of the insertion aperture 232. An intermediate portion 231a thereof is formed to have a cross section of substantially a quadrilateral. Two end portions 231b and 231c thereof are formed to have circular cross sections. The intermediate portion 231a has formed two opposing surfaces 234a1 and 234a2 stopper convex surfaces 234a and 234b in an opposing relation these stopper convex surfaces are placed about the center of the protective plug 231 lengthwise. The intermediate portion 231a has formed on the other two opposing surfaces 231a3 and 231a4 click stopper protrusions 235a and 235b of substantially hemispheric configuration. These click stopper protrusions 235a and 235b are displaced at a predetermined spacing from each other relative to the length direction of the protective plug 231 such that, even when the protective plug 231 is inverted, these click stopper protrusions 235a and 235b can be located at the same positions.

Protrusion surfaces 235a1 and 235b1 of the click stopper protrusions 235a and 235b are formed thin so that they can be slightly deformed due to their flexibility. That is, the protrusion surfaces 235a1 and 235b1 are formed thin by forming spot facing holes 235a2 and 235b2 having predetermined depths from the surfaces opposite to the protrusion surfaces of the click stopper protrusions 35a and 35b.

On the other hand, the insertion aperture 232 into which the protective plug 231 constructed as described above is inserted, is a hollow portion having an inner diameter nearly equal to the diameter of the transverse cross section of the intermediate portion 231a of the protective plug 231. The insertion aperture 232 is formed through the upper part 2 to the lower part 3 and stopper convex surfaces 236a and 236b are formed on inner wall surfaces of the insertion aperture 232 in an opposing relation in one direction i.e. surfaces 232a and 232b oppose the stopper convex surfaces 234a and 234b of the plug 231 across the jointed portion of the upper and lower parts 2 and 3 of the cassette casing 1 such that stopper convex surfaces 234a and 234b are slidably engaged therewith in the longitudinal direction of the insertion aperture 232. The stopper convex surfaces 234a and 234b are moved and engaged with the stopper concave portions 236a and 236b, whereby the stroke of the protective plug 231 is restricted.

Click stopper concave portions 237a and 237b are formed on the inner wall surfaces of the insertion aperture 232 opposing other surfaces, i.e. on its surfaces 232c and 232d opposing to the click stopper protrusions 235a and 235b of the protective plug 231 across the joined portion of the upper and lower parts 2 and 3 of the cassette casing 1 such that the click stopper concave portions 237a and 237b may be engaged with the click stopper protrusions 235a and 235b. A guide groove 237a1 extending to the upper part 2 side is formed to be continuously communicated to the click stopper concave portion 237a corresponding to one click stopper protrusion 235a. A guide groove 237b1 extending to the lower part 3 side is formed to be continuously communicated to the click stopper concave portion 237b corresponding to the other click stopper protrusion 235b. The two guide grooves 237a1 and 237b1 are shallower than the click stopper concave portions 237a and 237b, respectively.

Operations of the erasure preventing mechanisms 12 and 13, which are constructed by the protective plugs 231 and the insertion apertures 232, will be explained hereinafter.

Initially, when the protective plug 231 in the insertion aperture 232 is located within the insertion aperture 232 at its upper position in the thickness direction of the cassette casing 1, or when it is located on the upper part 2 side, the stopper convex surfaces 234a and 234b of the protective plug 231 are respectively positioned in the stopper concave portions 236a and 236b of the insertion apertures 232 at the upper part 2 side, as shown by the solid lines in FIGS. 16 and 17, and under this condition, the click stopper protrusion member 235b is in engagement with the click stopper concave portion 237b. Since both the click stopper protrusion members 235a and 235b are positionally deviated from each other, one click stopper protrusion 235a is not engaged with one click stopper concave surface 237a and is urged against the guide groove 237a1 of the upper part 2 side. In this state, this click stopper protrusion 235a is pushed by a proper predetermined pushing force because the guide groove 237a1 urged therewith has the level difference between it and the inner wall surface of the insertion aperture 232 and the protrusion portion surface 235a1 is deformed with flexibility. By this pushing force, the other click stopper protrusion 235b is urged against and engaged with the other click stopper concave portion 237b so that the protective plug 231 is positively positioned and held at the upper side of the insertion aperture 232.

When the protective plug 231 is located at the lower position of the insertion aperture 232, that is, located at the lower part 3 side, as shown by two-dot chain lines in FIGS. 16 and 17, the stopper convex portions 234a, 234b are brought in contact with the stopper concave portions 236a, 236b in the lower part 3 side. Under this condition, one click stopper protrusion 235a is engaged with one click stopper concave portion 237a. The other click stopper protrusion 235b is disengaged from the other click stopper concave portion 237b and is urged against the guide groove 237b1 of the lower part 3 side.

In this state, similarly to the case that the protective plug 231 is located at the upper position, one click stopper protrusion 235a is urged against and engaged with one click stopper concave portion 237a by a proper pushing force of the other click stopper protrusion 235b similarly as described above, whereby the protective plug 31 is positively placed at the lower side of the insertion aperture 232.

In the position switching operation of the protective plug 231, since the protective plug 231 is moved under the condition that the click stopper protrusions 235a and 235b are brought in slidable contact with the inner surfaces of the guide grooves 237a1 and 237b1 of the click stopper concave portions 237a and 237b, the position of the protective plug 231 can be switched stably and smoothly. Particularly, in this embodiment, since the click stopper protrusions 235a and 235b are flexibly deformed in the direction in which they are pushed, the protective plug 231 can be moved more smoothly, and the click stopper protrusions 235a and 235b can be engaged with the click stopper concave portions 237a and 237b more positively.

Further, in the position switching operation of the protective plug 231, when the protective plug 231 is pushed by a larger pushing force than is necessary so that the click stopper protrusions 235a and 235b exceed over the click stopper concave portions 237a and 237b, the stopper convex surfaces 234a and 234b are contacted with and engaged with the end edges of the stopper concave portions 236a and 236b of the insertion aperture 232 to thereby inhibit the protective plug 231 from being slid further, thus preventing the protective plug 231 from being disengaged from the insertion aperture 232.

As described above, the position of the protective plug 231 is changed relative to the insertion aperture 232 of the cassette casing 1, and this change of the position is detected by a detecting switch through a detecting pin or the like, whereby the two conditions of the erase possible condition and the erasure preventing condition can be identified positively.

The erasure preventing mechanisms 12 and 13 of this embodiment can perform exactly the same position switching operation, that is, detecting operation as described above even when they are inverted in their vertical direction.

While the embodiment of this invention is described as above, the present invention is not limited thereto and various modifications thereof can be effected. For example, the shape of the transversal section of the protective plug 231 and the inner shape of the insertion aperture 232 are not limited to quadrilaterals and may be hexagonal or the like in which the stopper means can be formed of at least two opposing surfaces and the click stopper means can be formed of another two opposing surfaces.

According to the present invention, as described above, the magnetic tape cassette is provided, in which the stopper means for preventing the protective plug from being disengaged and the position click stopper means for engaging the protective plug at the predetermined switching positions of the erase possible condition and the erasure preventing condition and independently provided between the protective plug slidably inserted into the thickness direction of the cassette casing and the insertion aperture into which the protective plug is inserted, and the click stopper means is formed by coupling the protective plug and the guide portion. Therefore, the switching operation of the protective plug can be stably and smoothly carried out, whereby the magnetic tape cassette can be positively placed in the erase possible condition and the erasure preventing condition with ease.

Further, when the protective plug is pushed by a larger pushing force than is necessary in this switching operation or when the click stopper means is worn, the protective plug can be prevented from being disengaged from the insertion aperture and the erasure can be positively avoided, rendering the magnetic tape cassette high in reliability.

The thus constructed magnetic tape cassette is constructed as the extremely small type as set forth so that there is the risk that, if this magnetic tape cassette is used alone, it will be lost. Thus, when not in use, a plurality of the magnetic tape cassettes are accommodated within the cassette magazine which will be referred to later and are placed in the preservation state.

The lid 6, which opens and closes the opening portion 5, is modified such that the magnetic tape cassette can be accurately accommodated within the cassette magazine and a desired tape cassette can be taken out therefrom with ease.

More specifically, the guide groove 22 provided on the front wall of the lid 6 is formed with a displacement toward one of the upper and lower sides (toward the lower side in this embodiment) from the central portion of the lid 6 in the vertical direction. This guide groove 22 is adapted to restrict the direction in which the magnetic tape cassette is inserted into the cassette magazine, as will be described later.

The engaging portion 23 formed along the guide groove 22 is used to withdraw the magnetic tape cassette from the cassette magazine. In this embodiment, this engaging portion 23 is composed of first to fourth cutaway concave portions 23a, 23b, 23c and 23d which are formed between two end portions of the lid 6 along the guide groove 22 in the lateral direction. To be more specific, the first and fourth cutaway concave portions 23a and 23d are formed at left and right end portions of the front surface of the lid 6 so as to be opened at the side surfaces of the lid 6. Between the two cutaway concave portions 23a and 23d, the second and third cutaway concave portions 23b and 23c are formed at the front central portion of the lid 6. These four cutaway concave portions 23a, 23b, 23c and 23d are formed at a substantially equal spacing.

Figure 18:
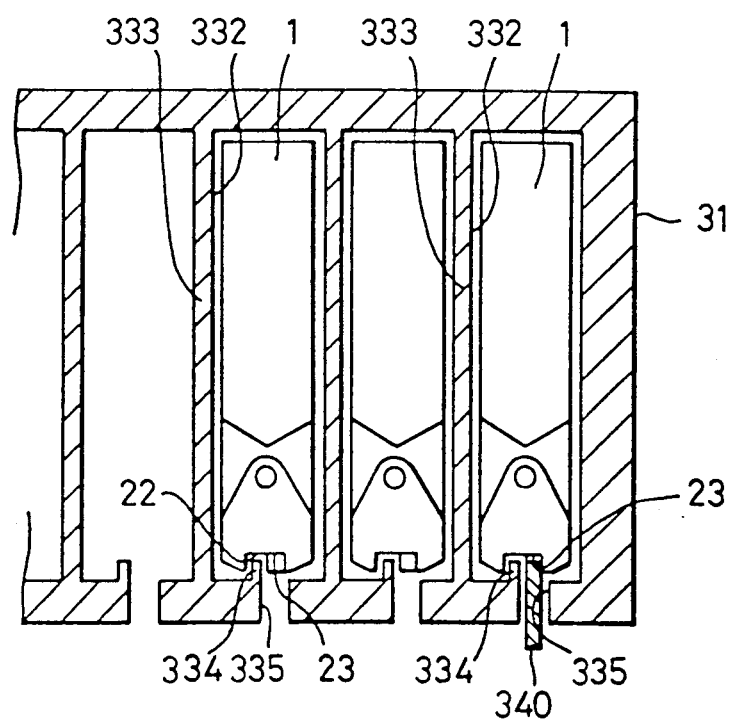
FIG. 18 is a cross-sectional view of a cassette magazine to which the present invention is applied.

FIG. 18 shows an example of a cassette magazine 331.

Referring to FIG. 18, this cassette magazine 331 is provided with a plurality of accommodating portions 332 into which the magnetic tape cassettes 1 are loaded in the lateral direction. These accommodating portions 332 are isolated by partition walls 333, respectively. An engaging protrusion 334 is formed on the bottom portion of each of the accommodating portions 332 so as to be extended in the depth direction. When the magnetic tape cassette 1 is accommodated within the accommodating portion 332, the guide groove 22 of the lid 6 is engaged with the engaging protrusion 334.

In the loading of the magnetic tape cassette 1 into the accommodating portion 332 of the cassette magazine 331, the guide groove 22 of the lid 6 is deviated from the central portion of the lid 6 so that, if the magnetic tape cassette 1 is reversed and loaded into the accommodating portion 332 of the cassette magazine 331 in the opposite direction, the guide groove 22 cannot be opposed to the engaging protrusion 334 accurately, thereby the magnetic tape cassette 1 being prevented from being loaded into the accommodating portion 332 of the cassette magazine 331 in the opposite direction.

A slit 335 is formed on the bottom portion of each of the accommodating portions 332 next to the engaging protrusion 334, and a withdrawing arm of a cassette withdrawing apparatus, which will be later referred to, is inserted into this slit 335.

A plurality of magnetic tape cassettes accommodated within the thus constructed cassette magazine are loaded onto a recording and reproducing apparatus under the condition that they are accommodated within the cassette magazine. Within the recording and reproducing apparatus, a desired magnetic tape cassette is automatically taken out from the cassette magazine by a cassette changer system of the recording and reproducing apparatus, and the recording and reproduction are performed.

The cassette changer system of the recording and reproducing apparatus will be explained with reference to FIG. 19.

Figure 19:
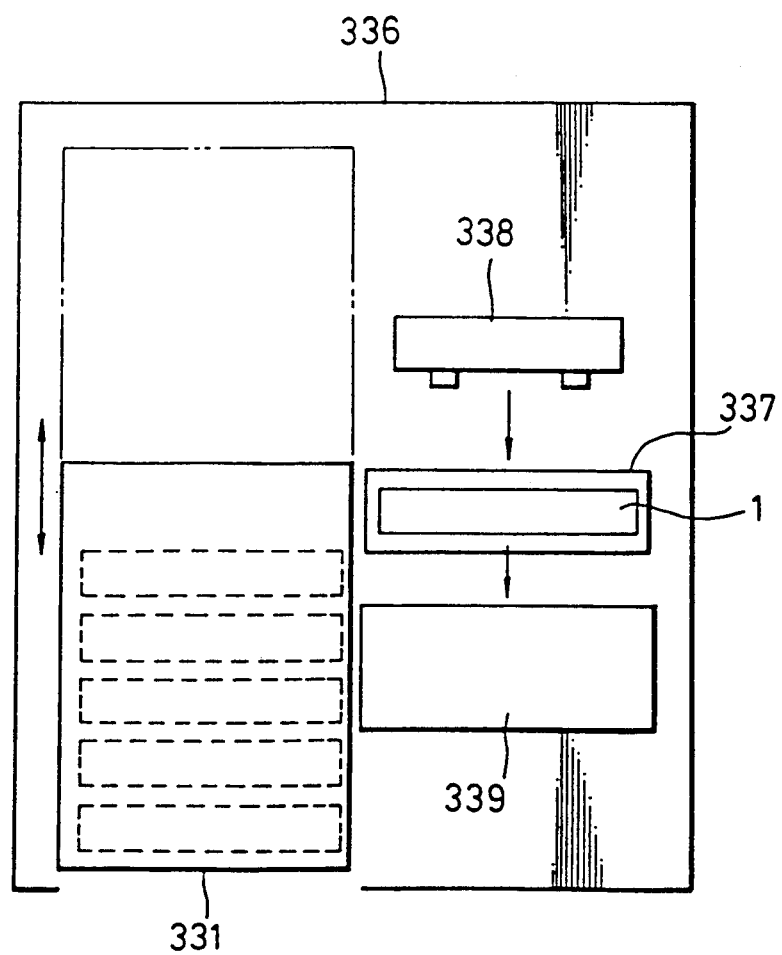
FIG. 19 is a schematic diagram showing an outline of a cassette changer system to which the present invention is applied.

In FIG. 19, reference numeral 336 generally designates a recording and reproducing apparatus. When the cassette magazine 331 in which a plurality of magnetic tape cassettes are accommodated is inserted into this recording and reproducing apparatus 336, the cassette magazine 331 is moved by a predetermined moving mechanism (not shown) and one magnetic tape cassette is withdrawn from the designated accommodating portion 332 by a withdrawing apparatus 337. When the tape cassette 1 is withdrawn from the cassette magazine 331, the magnetic tape cassette 1 is carried to a driving mechanism section 339 by a moving apparatus 338 and loaded onto the driving mechanism section 339. In this driving mechanism section 339, the aforementioned rotary head 41 is inserted into the opening portion 5 of the magnetic tape cassette 1, whereby the predetermined recording or reproduction is performed.

The cassette withdrawing apparatus 337 for withdrawing the magnetic tape cassette 1 from the cassette magazine 331 in the cassette changer system is arranged as shown in FIG. 20. As shown in FIG. 20, this cassette withdrawing apparatus 337 is provided with a withdrawing arm 340, and the withdrawing arm 340 has formed at a top portion thereof a ratchet-shaped engaging nail portion 340a which is engaged with the engaging portion 23 of the lid 6 only in the direction in which the magnetic tape cassette 1 is withdrawn from the cassette magazine 331. When the cassette withdrawing arm 340 is reciprocated, its engaging nail portion 340a is engaged with the engaging portion 23 of the magnetic tape cassette 1, thereby the magnetic tape cassette 1 being withdrawn from the cassette magazine 331.

In this embodiment, the magnetic tape cassette 1 can be withdrawn from the cassette magazine 331 by reciprocating the withdrawing arm 340 by a small stroke a plurality of times. More specifically, by the first reciprocation of the withdrawing arm 340, the engaging nail portion 340a is engaged with the third cutaway concave portion 23c of the engaging portion 23 to withdraw the magnetic tape cassette 1 from the cassette magazine 331 by about $\frac{1}{3}$ of the entire magnetic tape cassette. By the second reciprocation of the withdrawing arm 340, the engaging nail portion 340a is engaged with the second cutaway concave portion 23b of the engaging portion 23 to withdraw the magnetic tape cassette 1 from the cassette magazine 331 by about $\frac{2}{3}$ of the entire magnetic tape cassette 1. Then, in the third reciprocation of the withdrawing arm 340, the engaging nail portion 340a is engaged with the first cutaway concave portion 23a of the engaging portion 23, whereby the entire arrangement of the magnetic tape cassette 1 is withdrawn from the cassette magazine 331.

The magnetic tape cassette 1 thus withdrawn from the cassette magazine 331 is carried to the driving mechanism section 339 by the moving apparatus 338 of the cassette changer system, thereby the recording or reproduction being performed.

In the magnetic tape cassette 1 of this embodiment, since the engaging portion 23 to be engaged with the withdrawing arm 340 of the cassette changer is formed on the front surface of the lid 6, the magnetic tape cassette 1 can be withdrawn from the cassette magazine 331 with ease, and can be applied to the cassette changer system.

Further, in this embodiment, the engaging portion 23 is formed of a plurality of cutaway concave portions 23a, 23b, 23c and 23d arranged in the lateral direction of the lid 6 at substantially equal spacing so that the stroke of one reciprocation of the withdrawing arm 340 can be reduced, thus making it possible to withdraw the magnetic tape cassette 1 from the cassette magazine 331 by a plurality of strokes. Therefore, the withdrawing apparatus 337 can be miniaturized, which can make the overall system of the cassette changer system small in size.

Since the engaging portion 23 is formed on the lid 6, the present invention can be applied to the conventional magnetic tape cassette without large changes from a design standpoint.

More specifically, if the engaging portion 23 is provided in the cassette casing 1 side instead of the lid 6, a magnetic tape accommodating space and the locations of various detection holes or the like must be varied in a wide variety of positions because the spacing of the cassette casing 1 is very restricted, which provides a very difficult design. In this embodiment, since the engaging portion 23 is provided at the so-called vacant spacing of the front surface of the lid 6, the designing of the cassette casing 1 is not affected at all and the lid 6 may be modified very slightly. Therefore, the present invention can be effected with ease.

As set out above, according to the present invention, since the engaging portion to be engaged with the withdrawing member of the cassette changer is provided on the lid that is pivotally attached at the front portion of the cassette casing of the magnetic tape cassette, the magnetic tape cassette can be taken out from the cassette magazine with ease.

Further, since this engaging portion is provided on the lid which is pivotally attached at the front portion of the cassette casing, the present invention can be applied to the existing magnetic tape cassette without large modifications from a design standpoint.

For example, the rollers 43a and 44a mounted on the front ends of the wing guides 43 and 44 provided on the head drum 42 may be modified such that upper and lower flange portions are secured to the wing guides 43 and 44 and the intermediate cylindrical portions which come in contact with the magnetic tape are formed as rotatable rollers.

It is needless to say that the magnetic tape cassette of the present invention is not limited to the very small type tape cassette and may be applied to a large tape cassette.

As set forth above, the magnetic tape cassette of the present invention has the opening portion into which the head drum having the rotary head is inserted. The pair of tape guide members which guide the tape-like record medium so that the record medium is helically wrapped around the head drum are provided in the inside of the opening portion so as to be able to swing independently. Thus, when the head drum is inserted into the opening portion, even if elevation angle, azimuth angle and guide opening angle or composite angle of the aforementioned angles are different, the pair of tape guide members can be moved accommodating such differences. Also, the spacing between the two tape guide members is determined by the wing guides of the head drum. The two tape guide members are brought in slidable contact with the circumferential surface of the insertion portion of the head drum to form the ideal tape path, and the tape-like record medium comes in slidable contact with the circumferential surface of the head drum accurately, whereby the center of the wrapping angle of the tape-like record medium is correctly held. Therefore, the position of the record pattern of the tape-like record medium can be prevented from being displaced so that the recording and/or reproduction can be positively carried out, which increases reliability of the magnetic tape cassette.

Since the cassette casing and the tape guide members are independently provided, an optimum material can be selected as the material of the tape guide members. The cassette shells forming the cassette casing can be prevented from being deformed and can be prevented from being irregularly produced in the manufacturing process. Thus, the dimensional accuracy can be determined with large freedom, which as a result reduces the cost.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

We claim as our invention:

1. A magnetic tape cassette in which an opening portion is formed on the front surface side of a cassette casing and into which a head drum is inserted, a tape-like record medium wound around reel hubs and housed in the cassette casing is helically wrapped around said head drum upon insertion thereof into said opening portion and a helical scan recording and/or reproduction is performed by a rotating head mounted on said head drum, said magnetic tape cassette comprising a pair of tape guide members mounted inside of said opening portion of said cassette casing so as to be independently pivotally adjustable, said pair of tape guide members guiding said tape-like record medium such that said record medium is maintained in a helically wrapped position around said head drum.

2. A magnetic tape cassette according to claim 1, wherein a spring is interposed between one portion of a rear surface of each of said tape guide members and a supporting portion implanted on the inner surface of said cassette casing to spring-bias said tape guide members in a direction toward each other so that said tape guide members can be moved in the lateral direction.

3. A magnetic tape cassette according to claim 1, wherein said pair of tape guide members are provided at their front ends toward the opening portion of said cassette casing with vertical columnar guide portions for guiding said tape-like record medium to said pair of tape guide members.

4. A magnetic tape cassette according to claim 3, wherein said vertical columnar guide portions have at their end portions toward the opening portion of said cassette casing pressing edge portions having concave portions provided at upper and lower portions of said tape guide members for positioning said vertical columnar guide portions when said concave portions of said pressing edge portions are brought in contact with a pair of wing guides provided on the sides of said head drum.

5. A magnetic tape cassette according to claim 1, wherein bearing brackets having shaft apertures engaged with shafts implanted on the inner surface of said cassette casing are formed on rear surface sides of guide surfaces formed on said tape guide members.

6. A magnetic tape cassette according to claim 5, wherein said bearing brackets provided on said tape guide members have shaft apertures elongated in the left to right direction as seen from the front surface of the opening portion of said cassette casing and are engaged with the shafts implanted on the inner surface of said cassette casing so that said tape guides can be moved in the left to right direction more freely than in the front to rear direction.

7. A magnetic tape cassette according to claim 5, wherein said bearing brackets provided on said tape guide members have at substantially vertical midpoints of inner peripheral surfaces of said shaft apertures protruding shaft supporting edges and said protruding shaft supporting edges are engaged with shafts implanted on the inner surface of said cassette casing so that said tape guide members can be rotated freely about said bearing brackets and pivoted in the vertical direction.

8. A magnetic tape cassette according to claim 1, wherein said pair of tape guide members have arcuate tape guide surfaces which coincide with the circumferential surface of said head drum.

9. A magnetic tape cassette according to claim 8, wherein said arcuate tape guide surfaces of said pair of tape guide members are formed having inclined surfaces inclined in opposite directions.

10. A magnetic tape cassette according to claim 9, wherein said pair of tape guide members have on upper and lower portions of said tape guide surfaces protruding supporting edge portions at a spacing wider than the width of said tape-like record medium.

11. A magnetic tape cassette according to claim 10, wherein said pair of tape guide members have at their front ends toward the opening portion of said cassette casing receiving edge portions contiguous to said protruding supporting edge portions for guiding said head drum into position in said cassette casing.

12. A magnetic tape cassette according to any one of claims 1 to 11, wherein said magnetic tape cassette is used to record and/or reproduce a digital signal.

* * * * *